US010374436B2

(12) United States Patent
Winand et al.

(10) Patent No.: US 10,374,436 B2
(45) Date of Patent: Aug. 6, 2019

(54) MULTIMODE CHARGING DEVICE AND METHOD

(71) Applicant: Intelligent Energy Limited, Loughborough (GB)

(72) Inventors: Henri Winand, Loughborough (GB); John Joseph Murray, III, Loughborough (GB); Christopher William Bishop, Loughborough (GB); Graham Kirsopp, Loughborough (GB); Marco Mathar, Loughborough (GB); Andrew Kelly, Loughborough (GB); Zachary Elliot, Loughborough (GB); Christopher James Kirk, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 525 days.

(21) Appl. No.: 15/148,945

(22) Filed: May 6, 2016

(65) Prior Publication Data

US 2016/0322832 A1    Nov. 3, 2016

Related U.S. Application Data

(63) Continuation of application No. PCT/IB2014/002994, filed on Oct. 29, 2014, which is
(Continued)

(51) Int. Cl.
*H01M 8/04537* (2016.01)
*H02J 3/38* (2006.01)
(Continued)

(52) U.S. Cl.
CPC ........... *H02J 3/387* (2013.01); *H01M 8/0488* (2013.01); *H01M 8/04179* (2013.01);
(Continued)

(58) Field of Classification Search
CPC .............. H02J 3/387; H01M 8/04225; H01M 8/04179; H01M 8/04537; H01M 8/04835
(Continued)

(56) References Cited

U.S. PATENT DOCUMENTS

2004/0185316 A1* 9/2004 Wells ............... H01M 8/04007
429/429
2004/0247961 A1   12/2004 Edlund
(Continued)

FOREIGN PATENT DOCUMENTS

EP        2556985 A2    2/2013
WO   WO 2002/089244 A1   11/2002
(Continued)

OTHER PUBLICATIONS

International Patent Application No. PCT/IB2014/002994; Int'l Search Report and the Written Opinion; dated May 11, 2015; 11 pages.
(Continued)

*Primary Examiner* — Edward Tso
*Assistant Examiner* — Aaron Piggush
(74) *Attorney, Agent, or Firm* — BakerHostetler

(57) ABSTRACT

A charging device is configured to deliver power to a portable, power-consuming device, having a profile sensor which can detect information relating to the identity of power-consuming device to which the charging device is connected and may also have a communication channel configured to transmit said information to a remote server. In use, data can be collected or aggregated relating to power-consuming devices by connecting the charging device to the portable power-consuming device; sensing, by a profile sensor in the charging device, information relating to the identity of the power-consuming device; and transmitting the information to a remote server over a communication
(Continued)

channel. Collected data may, for example, be used to identify when fuel for a charging device may need replenishment.

8 Claims, 26 Drawing Sheets

Related U.S. Application Data a continuation of application No. PCT/IB2014/003017, filed on Nov. 7, 2014.

(60) Provisional application No. 61/900,937, filed on Nov. 6, 2013, provisional application No. 61/901,799, filed on Nov. 8, 2013, provisional application No. 61/974,577, filed on Apr. 3, 2014.

(51) Int. Cl.
*H02J 7/00* (2006.01)
*H01M 8/04828* (2016.01)
*H01M 8/04858* (2016.01)
*H01M 10/48* (2006.01)
*H01M 16/00* (2006.01)
*H01M 8/04119* (2016.01)
*H01M 8/04225* (2016.01)
*H02J 1/00* (2006.01)

(52) U.S. Cl.
CPC ... *H01M 8/04225* (2016.02); *H01M 8/04537* (2013.01); *H01M 8/04835* (2013.01); *H01M 10/48* (2013.01); *H01M 16/006* (2013.01); *H02J 7/0054* (2013.01); *H02J 2001/004* (2013.01); *H02J 2007/0062* (2013.01); *H02J 2007/0096* (2013.01)

(58) Field of Classification Search
USPC .......................................... 320/101, 103, 157
See application file for complete search history.

(56) References Cited

U.S. PATENT DOCUMENTS

| | | |
|---|---|---|
| 2008/0222431 A1 | 9/2008 | Paniagua et al. |
| 2011/0039164 A1 | 2/2011 | Akers et al. |
| 2012/0171590 A1 | 7/2012 | Matsumoto et al. |
| 2012/0321975 A1 | 12/2012 | Mitlitsky et al. |
| 2013/0214730 A1 | 8/2013 | Lu et al. |

FOREIGN PATENT DOCUMENTS

| | | |
|---|---|---|
| WO | WO 2013/019989 A2 | 2/2013 |
| WO | WO 2013/100764 A1 | 7/2013 |
| WO | WO 2013/104767 A1 | 7/2013 |

OTHER PUBLICATIONS

International Patent Application No. PCT/IB2014/003017; Int'l Search Report and the Written Opinion; dated Apr. 24, 2015; 11 pages.
International Patent Application No. PCT/IB2014/002994; Int'l Preliminary Report on Patentability; dated May 19, 2016; 8 pages.

\* cited by examiner

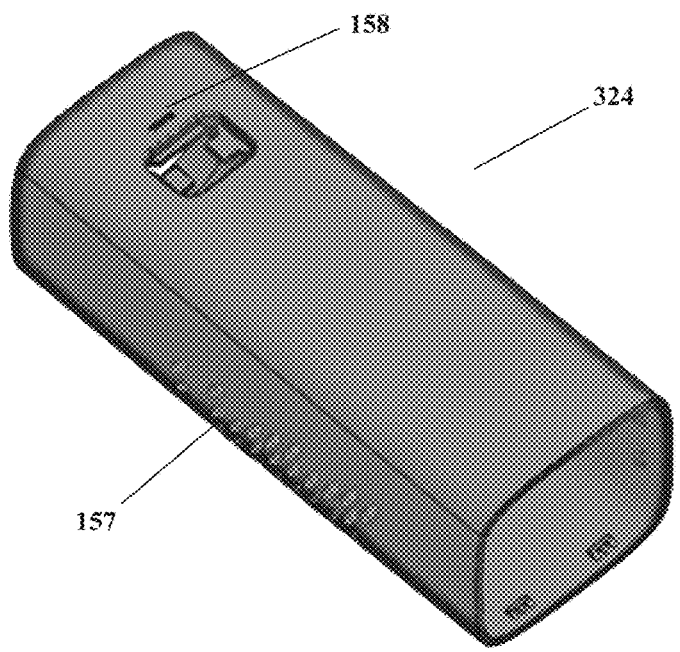
FIG. 5A
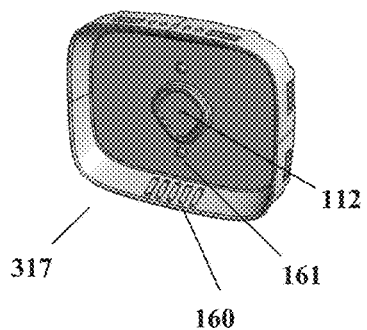 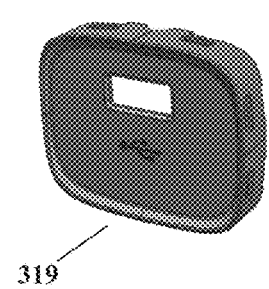 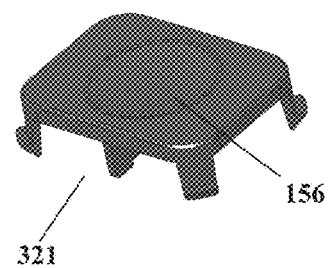
FIG. 5B　　　FIG. 5C　　　FIG. 5D

HARDWARE LEVEL

MULTIMODE CHARGING DEVICE AND METHOD

RELATED APPLICATIONS

This application is a continuation of International Patent Application No. PCT/IB2014/002994 filed Oct. 29, 2014 which claims the full Paris Convention benefit of and priority to U.S. provisional patent application No. 61/900,937 filed Nov. 6, 2013; and is also a continuation of International Patent Application No. PCT/IB2014/003017 filed Nov. 7, 2014 which claims the full Paris Convention benefit of and priority to U.S. Application No. 61/901,799 including the Appendices, filed Nov. 8, 2013, and U.S. Application No. 61/974,577, filed Apr. 3, 2014, the contents of which are incorporated by this reference, as if fully set forth herein.

FIELD

The disclosed invention is in the field of charging devices suitable for powering and/or recharging power-consuming devices.

BACKGROUND

Users of portable electronic devices require reliable sources of personal and portable energy to provide power to those devices during times when access to an electricity grid is unavailable. Commercially available portable electronic devices can exhibit a wide range of energy requirements and charging parameters.

Thus, there is a need for portable energy sources that can supply power to electronic devices at optimal voltage and power levels, which are determined by the types of devices and operating conditions. The invention is directed to these and other important needs.

SUMMARY

The present disclosure provides charging devices for charging power-consuming devices comprising a housing comprising an output end comprising an output port, a fuel supply end comprising a fuel inlet port and an external power input, and a housing body having cooling vents; a fuel cell system comprising an inlet valve actuated by a latching solenoid and fluidly connected to the fuel inlet port, a fuel cell stack, a purge valve actuated by a normally-closed non-latching solenoid and fluidly connected to the stack, a hydrogen pressure transducer, a stack temperature sensor, and a cooling system; a balance of plant comprising a printed circuit board assembly and a battery; and, wherein the charging device is configured to provide power to the output port via an internal battery and a the fuel cell stack electrically connected to the external power input. The present disclosure provides systems for delivering power to a power-consuming device comprising such charging devices and a source of hydrogen gas. The present disclosure provides methods of charging the battery of such charging devices, the methods comprising connecting a source of hydrogen gas to the fuel inlet port; operating the fuel cell stack; and charging the battery at one of a plurality of charge levels. In some instances the charge level is between 0 and about 500 mA.

The present disclosure provides methods for delivering power to a power-consuming device, the methods comprising connecting the power-consuming device to an output port of a charging device; the charging device comprising a housing having an output end comprising the output port, a fuel supply end comprising a fuel inlet valve and an external power input, an internal battery, an internal fan system, and an internal fuel cell stack; connecting a source of hydrogen gas to the charging device; delivering hydrogen gas to the internal fuel cell stack; operating the fuel cell stack and the internal fan system; and delivering power to the output port by selecting between power output from the internal battery and electrical power generated by operating the fuel cell stack.

The present disclosure provides methods for delivering power to a power-consuming device from a charging device comprising an internal battery and a fuel cell stack, the methods comprising selecting between providing power to an output via one of the internal battery and the fuel cell stack depending on one or more system requirements.

Aspects of the devices, systems and methods disclosed herein include a charging device for delivering power to a portable, power-consuming device, the charging device having a profile sensor configured to detect information relating to the identity of power-consuming device to which the charging device is connected; and, a communication channel configured to transmit said information to a remote server. In some instances the profile sensor is configured to receive an identity of the power-consuming device via a data exchange protocol for connectivity of the charging device and the power-consuming device. In some instances the profile sensor is configured to detect information relating to the identity of the power-consuming device by recording current and/or voltage supplied to the power-consuming device as a function of time.

The devices disclosed herein may further include a data log for temporarily storing data relating to the identity of power-consuming devices to which the charging device is or has been connected for charging or power supply.

The devices disclosed herein may further include a data relating to the identity of power-consuming devices comprises one or more of: a device unique identifier; a device generic type identifier; a device manufacturer identifier; a current-time profile; a voltage-time profile; a voltage-current profile; a charge state-time profile; a device usage profile.

Aspects of the devices, systems and methods disclosed include methods for aggregating data relating to power consuming devices whereby a charging device for delivering power to a portable power-consuming device is provided; it is connected to a charging device; sensing takes place via a profile sensor in the charging device, information relating to the identity of the power-consuming device; and, collected or aggregated data is transmitted to a remote server over a communication channel. In some instances the information relating to the identity of the consuming device is one or more of: a device unique identifier; a device generic type identifier; a device manufacturer identifier; a current-time profile; a voltage-time profile; a voltage-current profile; a charge state-time profile; a device usage profile. In some instances the sensing step comprises analyzing one or more the profiles and determining a device identity based on the profile. The method may also include sensing environment data and providing that data to at least the server wherein system parameters and data may be correlated to said environment data.

The method may include the remote server, via a communication channel indicating when a fuel source for a charging device may need replenishment. The method may include sensing, by a profile sensor in the charging device, operational data of the power-consuming device.

Aspects of the devices, systems and methods disclosed include methods for aggregating data relating to power consuming devices including connecting a plurality of charging device for delivering power to a plurality of portable power-consuming devices sensing, by a profile sensor in each charging device, information relating to the identity of the power-consuming device; sensing, by a profile sensor in each charging device, operational data of the power-consuming device; and transmitting said information to a remote server over a communication channel.

Operational data, in some instances is at least one of the date and/or time of each charging event, the voltage and I or current profile or 'signature' of each charging event, the geographical location of each charging event, and the condition of the charging device 1 at, before, during or after each charging event. In some instances the aggregated data is used to predict performance of power consuming device is in a variety of conditions.

The general description and the following detailed description are exemplary and explanatory only and are not restrictive of the disclosure, as defined in the appended claims.

Other aspects of the present disclosure will be apparent to those skilled in the art in view of the detailed description of the disclosure as provided herein.

BRIEF DESCRIPTION OF THE DRAWINGS

The summary, as well as the following detailed description, is further understood when read in conjunction with the appended drawings. For the purpose of illustrating the disclosure, there are shown in the drawings exemplary embodiments of the disclosure; however, the disclosure is not limited to the specific methods, compositions, and devices disclosed. In addition, the drawings are not necessarily drawn to scale.

In the drawings:

FIG. 5A shows a housing body of a charging device;

FIG. 5B shows an embodiment of an end cap for a fuel supply end of a housing;

FIG. 5C shows an embodiment of an end cap for an outlet end of a housing;

FIG. 5D shows an embodiment of a housing portion for a power button;

Figure 1:
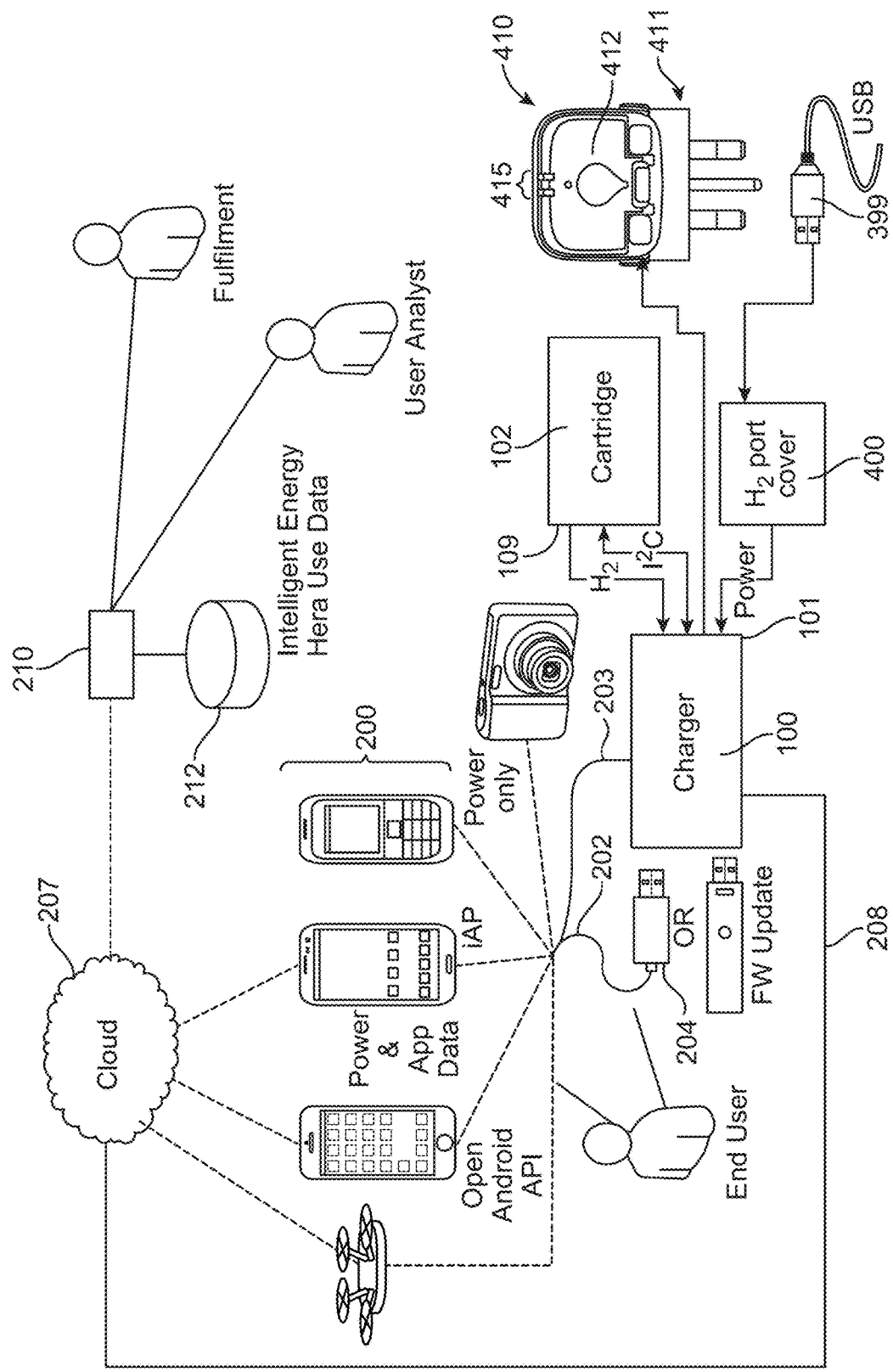
FIG. 1 shows a schematic diagram of an exemplary implementation of a system overview of a networkable charging device and power-consuming devices.

All call outs in the attached figures are hereby incorporated by this reference as if fully set forth herein.

It should be appreciated that, for simplicity and clarity of illustration, elements shown in the figures have not necessarily been drawn to scale. For example, the dimensions of some of the elements are exaggerated, relative to each other, for clarity. Further, where considered appropriate, reference numerals have been repeated among the Figures to indicate corresponding elements. While the specification concludes with claims defining the features of the present disclosure that are regarded as novel, it is believed that the present disclosure's teachings will be better understood from a consideration of the following description in conjunction with the figures in which like reference numerals are carried forward.

Further Description

The present disclosure may be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the disclosure which are, for clarity, described herein in the context of separate embodiments, may also be provided in combination in a single embodiment. Conversely, various features of the disclosure that are, for brevity, described in the context of a single embodiment, may also be provided separately or in any sub-combination. Further, reference to values stated in ranges include each and every value within that range.

Persons of ordinary skill in the art of computer programming will recognize that the disclosure herein references operations that are performed by a computer system. Operations which are sometimes referred to as being computer-executed. It will be appreciated that such operations are symbolically represented to include the manipulation by a processor, such as a CPU, with electrical signals representing data bits and the maintenance of data bits at memory locations, such as in system memory, as well as other processing of signals. Memory locations wherein data bits are maintained are physical locations that have particular electrical, magnetic, optical, or organic properties corresponding to the data bits.

When implemented in software, elements disclosed herein are aspects of some of the code segments to perform necessary tasks. The code segments can be stored in a non-transitory processor readable medium, which may include any medium that can store information. Examples of the non-transitory processor readable mediums include an electronic circuit, a semiconductor memory device, a read-only memory (ROM), a flash memory or other nonvolatile memory, an optical disk, a hard disk, etc. The term module may refer to a software-only implementation, a hardware-only implementation, or any combination thereof. Moreover, the term servers may both refer to the physical servers on which an application may be executed in whole or in part.

In some exemplary implementations of the disclosure there are charging devices which comprise a housing, a fuel cell system, and a balance of plant. The housing may comprise an output end that comprises an output port, a fuel supply end that comprises a fuel inlet port and an external power input, and a housing body having cooling vents. The fuel cell system can comprise an inlet valve actuated by a latching solenoid that is fluidly connected to the fuel inlet port, a fuel cell stack, a purge valve actuated by a normally-closed non-latching solenoid that is fluidly connected to the fuel cell stack, a hydrogen pressure transducer, a stack temperature sensor, and a cooling system, one or more printed circuit board assemblies and a battery. In some embodiments, the charging device can be configured to provide power to the output port via one of the battery and the fuel cell stack. The present disclosure also provides systems for delivering power to a power-consuming device. In some instances the system includes a charging device as described above and a source of hydrogen gas. The source of hydrogen gas can comprise a pressurized tank or a cartridge filled with a hydride which includes a metal hydride adapted to produce hydrogen gas. Also disclosed herein are methods for charging the battery of a charging device as described above. The method can include steps of connecting a source of hydrogen gas to the fuel inlet port, operating the fuel cell stack, and charging the battery at one of a plurality of charge levels. In some instances those charge levels are between 0 and about 500 milliamps, in some instance the power levels exceed 500 milliamps, in some instances the charge levels exceed 1000 milliamps, in some instances the charge levels exceed 2000 milliamps, in some instances the charge levels exceed 5000 milliamps, and in some instances the charge levels exceed 10000 milliamps. In some instances the fuel cell output is up to about 1 KW (kilowatt), in some instances the fuel cell output is between about 1 KW and 2 KW, in some instances the fuel cell output is between about 2 KW and 3 KW, in some instances the fuel cell output is between about 3 KW and 4 KW, in some instances the fuel cell output is between about 4 KW and 5 KW and in some instances the fuel cell output is exceeds 5 KWS. Further described herein are other methods of charging the battery of the charging device as described above, wherein the method can include steps of connecting an external power source to the external power input and charging the battery at one of a plurality of charge levels. In some instances the external power sources can be a USB-powered cover configured to attach to the fuel supply end of the housing or a mains adapter configured to attach to the fuel supply end of the housing and deliver power from a mains power supply.

Also disclosed herein are aspects of methods for delivering power to an electrical power-consuming device such as a processor, communications chipset, radio, servo motor, controller, propulsion motor, the methods comprising connecting the power-consuming device to an output port of a charging device; the charging device comprising a housing having an output end comprising the output port, a fuel supply end comprising a fuel inlet valve and an external power input, an internal battery, an internal fan system, and an internal fuel cell stack; connecting a source of hydrogen gas to the charging device; delivering hydrogen gas to the internal fuel cell stack; operating the fuel cell stack and the internal fan system; and delivering power to the output port by selecting between power output from the internal battery and electrical power generated by operating the fuel cell stack.

In some exemplars aspects of methods include monitoring the status of one or more of the power-consuming device, the internal battery, and the internal fuel cell stack to determine when to terminate the delivery of power. In further embodiments, the monitoring the status of the power-consuming device comprises monitoring the charge of a battery in the power-consuming device through the use of a mobile application on the power-consuming device. In other embodiments, the monitoring of the internal fuel cell stack comprises monitoring one or more of the fuel cell stack voltage and fuel cell stack current. In yet other embodiments, the monitoring the status of the power-consuming device comprises monitoring the charge current drawn by the power-consuming device and determining that the power-consuming device is fully charged. In other implementations of the methods, the source of hydrogen gas is a cartridge filled with one or more of hydrogen gas and a metal hydride, and the method further comprises authenticating the source of hydrogen gas after the step of connecting the source of hydrogen gas to the charging device and before the step of delivering hydrogen gas to the internal fuel cell stack. In some instances, during the operating of the fuel cell stack, the methods further comprise periodically switching off the fan system and short circuiting the fuel cell stack. In some implementations, during the operating of the fuel cell stack, the methods further comprise periodically opening a purge valve actuated by a normally-closed non-latching solenoid and fluidly connected to the fuel cell stack to clear excess water vapor from an anode in the fuel cell stack. In some embodiments, the periodic opening of the purge valve occurs no more than a total of about 400 milliseconds every 300 seconds; in other embodiments, the periodic opening of the purge valve has a hold-up period of about 72 seconds for every 100 milliseconds of opening time.

In some instances an authentication process to verify the source of hydrogen gas can comprise connecting the charging device with a serial EEPROM associated with the source of hydrogen gas over an I²C bus.

Also disclosed herein are methods for delivering power to a power-consuming device from a charging device comprising an internal battery and a fuel cell stack, the methods include selecting between providing power to an output via one of the internal battery and the fuel cell stack depending on one or more system requirements. In some instances the methods may include commissioning the fuel cell stack before it provides power output. In some instances, the methods further comprise short circuiting the fuel cell stack for a short period of time in order to boost the average fuel cell voltage.

In some instances aspects of methods include alternating between providing power from the internal battery and providing power from the fuel cell stack at a high frequency. In yet other embodiments, the methods further comprise reducing the duty cycle on the fuel cell stack during the alternating until the fuel cell stack voltage increases above the threshold voltage value. In some embodiments, the fuel cell stack is conditioned upon first use to hydrate a membrane electrode assembly of the fuel cell stack and remove at least a portion of one or more oxide layers, and the conditioning comprises limiting the available charge current to predetermined milliamp value; operating the fuel cell stack for a period of about 2 hours, during which time a process comprising (a) switching off an air-circulation system for the fuel cell stack, (b) short circuiting the fuel cell stack for five seconds, and (c) switching on the air-circulation system to full power is repeated with increasing frequency; and monitoring the charge current to utilize the internal battery to maintain the charge current to the power-consuming device at a desired level.

In one exemplar selecting between providing power to an output via one of the internal battery and the fuel cell stack depending includes monitoring the fuel cell stack voltage and comparing the fuel cell stack voltage to a threshold voltage value based upon the charge current being delivered to the power-consuming device. The monitoring can be performed at a frequency of about once per millisecond; the threshold voltage value for a charge current of 700 mA or less can be about 3.2V; the threshold voltage value for a charge current of above 700 mA can be about 3.1V.

FIG. 1 provides a system overview. A charging device 100 can be periodically connected to a power-consuming device 200 by way of a charging and data link 202 which may be fixed 203 or detachable/disconnectable 204. The charging device 100 is connected, via a charging and data link 202 to the power-consuming device 200. The charging device 100 may be connected to the data communication network 207 via a data link 208, which is in signal communications with a server 210 having a database 212. Power-consuming device 200 can be a processor, communications chipset, radio, servo motor, controller, propulsion motor, or any electrical device including those with an operating system (OS) such Microsoft's™ OS, Linux™'s OS, Apple™, s OS, Google™ s OS, etc. In some instances the OS and can utilize a mobile companion application that can provide a user with information about the status and operation of the charging device 100, fuel cartridge 102, or power consuming device 200. The hydrogen input end 101 the charging device 100 is operatively attached to a cartridge 102 (which can supply hydrogen gas to the charging device 100), and may also be connected to a smart hydrogen port cover 400, a mains adapter 410, or a dummy cover (not shown). From the charging device 200 power output in some instances will be between about 1 KW and 5 KWs and in other instances may exceed 5 KWs, finally in yet other instances the outputs may be less than 1 KW. The output may be determined or controlled by the microcontrollers and/or by the size and maximum output of the fuel cell stack and/or internal battery.

Figure 2:
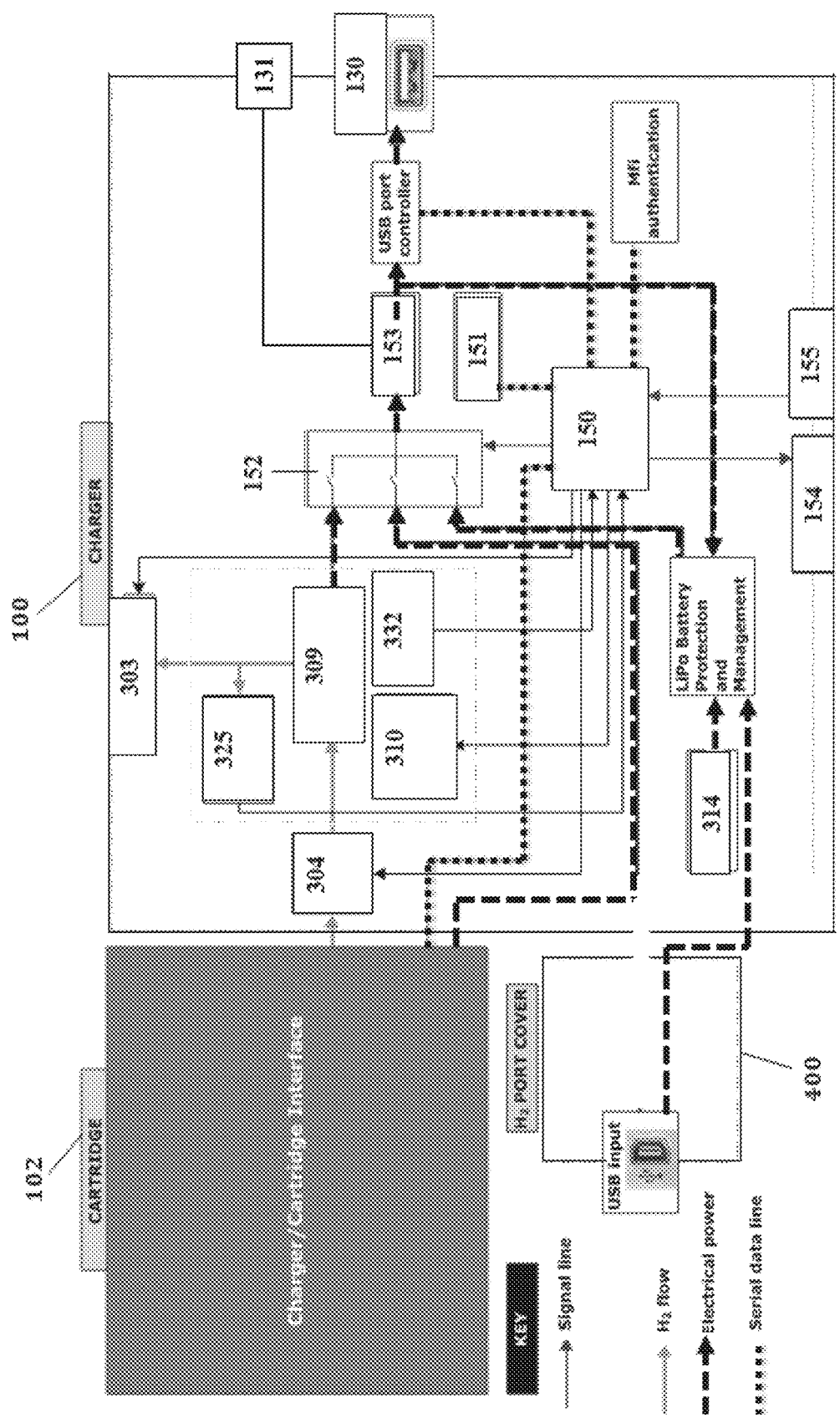
FIG. 2 shows a schematic diagram of a top level state of a charging device and system.

FIG. 2 provides a schematic diagram of a top level state of a charging device 100 and overall system. The charging device 100 contains two means for providing power which may be delivered to a power-consuming device through USB output 130 or output 131 for higher power outputs or utilized internally by the charging device: a fuel cell stack (also referred to as a "stack") 110, and a battery 115. The charging device 100 may utilize a hydrogen fuel source designated "cartridge" 102 in FIGS. 1 and 2, which attaches to hydrogen input end 101 of the charging device 100. Those of ordinary skill in the art will recognize that a PEM fuel cell stack as described herein, accepts an input feed of very pure hydrogen and the cartridge is one implementation to supply suitable hydrogen. If a cartridge 102 is used to supply suitable hydrogen, the cartridge 102 can be recycled and refilled with hydrogen fuel for reuse. The charging device 100 also houses one or more controllers which may be microcontrollers 150, at least one battery thermistor, solid state memory 151, a power pathway 152, and a DC/DC converter 153 to supply power to at least one of power outputs 130 and 130'. The solid state memory 151 is provided with the system and is used to store or log error/fault data transmitted from the one or more microcontrollers 150. The system uses various data inputs to monitor the health and performance of the charging device 100, including the operation of the fuel cell stack and internal battery. The one or more microcontrollers 150 can control an LED 154, which can be a multi-color LED. The microcontroller(s) 150 can also monitor a switch 155 for input from a user.

Figure 3:
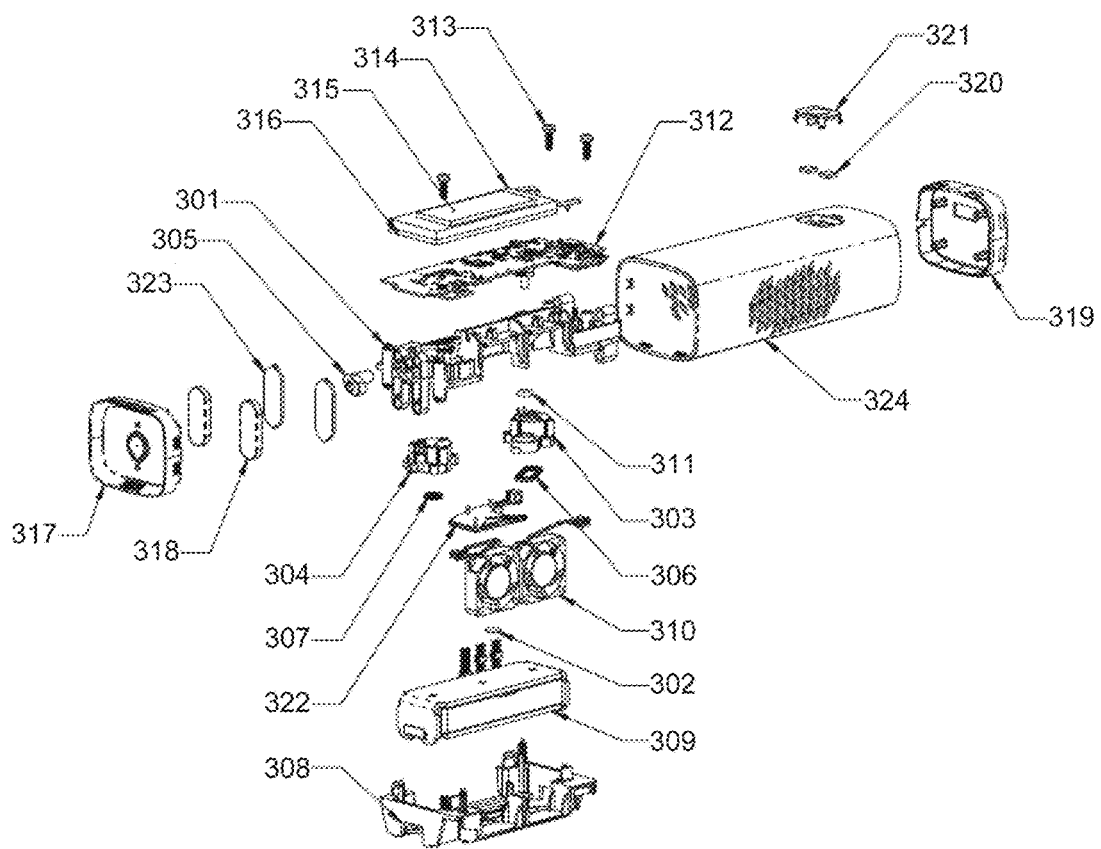
FIG. 3 shows a schematic diagram of an exploded view of a charging device.

FIG. 3 provides a schematic diagram of an exploded view of one implementation of a charging device 100. The charging device 100 contains all the electronics, fuel cell stack, valves, fans, battery, and a connection (which if the output is within power limits may be USB) for power output. The charging device 100 can convert supplied hydrogen, from a cartridge 102 or other hydrogen source, into electrical power for an attached power-consuming device. The components and subsystems of the charging device 100 are built around a chassis 301. A fuel cell stack assembly 309 can be attached to the underside of the chassis 301 by means of a chassis clamp 308. An inlet valve 304 and a purge valve 303 can be positioned at either end of the fuel cell stack assembly 309. A printed circuit board assembly 312 can be attached to the top of the fuel cell stack assembly 309 with a rechargeable battery 314 separated by a physical cushion between the battery 314 and the printed circuit board assembly 312, which can be a foam spacer 316. A means for cushioning between the battery 314 and the housing body 324 is also provided and can be a foam spacer 315. The fuel cell stack assembly 309 can be cooled by one or more fans 310. A pressure transducer 325 can be utilized to monitor the hydrogen pressure in the fuel cell stack assembly to check for leaks, monitor performance, and ensure safe operation. A housing encloses the chassis 301 and attached components. Fasteners, such as thread-forming screws 313 can be utilized in the assembly of the system. Sealing materials, such as o-rings 306 and 307 and gasket 305, can be utilized to maintain the hydrogen gas pathway from the interface with cartridge 102 through to the fuel cell stack assembly and then to the purge valve 303. As further seen in FIGS. 4 and 5A-D, the housing can comprise a housing body 324, hydrogen input end cap 317, power output end cap 319, and power button housing 321 that can retain power button 156 in a position to actuate switch 155. Housing body 324 can include air vents 157 to aid in cooling, ventilation, and purging of vapors and gases and an LED window 158 that can present LED indicator 154. One or more magnets 318 and steel plates 323 can be positioned adjacent to the hydrogen input end cap 317 to provide a magnetic attraction force to aid in the connection of the charging device 100 to a cartridge 102. A piece of foam 320 can be used to provide support to power button housing 321 to ensure proper alignment within the housing body 324 aperture.

Internal battery 314 can be a Lithium ion or Li-polymer ("LiPo") rechargeable battery, that supplies a nominal voltage of 3.7V that is increased on the printed circuit board assembly to 5.0V by the use of a DC-DC converter. The internal battery may be a series of Lithium ion or LiPo batteries thereby providing a multiplied voltage depending on the number of batteries in the series. Each battery capacity can be between about 500 mAH and about 10,000 mAH. Battery protection can be provided by monitoring of the hardware and firmware on the printed circuit board assembly for conditions including over-temperature, over-charge, and over-discharge. A battery thermistor can be used to monitor the batter temperature. In the case of any fault condition, the battery can be disconnected in order to maximize battery life and condition. Software controls the enabling of the internal battery as the current source of power and selects the rate at which the battery will be charged. The battery can be charged at a variety of charge rates. If desired, the maximum charge rate can be limited to a particular level due to hardware or software controls/limitations. The charging device software can shut down the charging device when the battery voltage is insufficient to support the balance of plant; the shutdown logic is battery voltage <3.45 volts for 5 seconds (for the first 5 minutes of run time), then <3.65 volts for 5 seconds thereafter.

Figure 6:
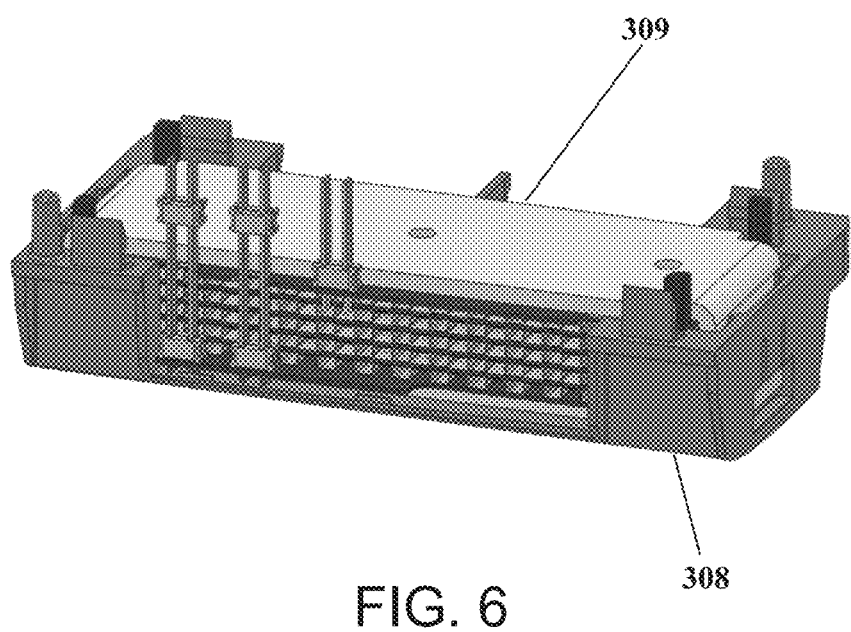
FIG. 6 shows an exterior view of an embodiment of a fuel cell stack.
Figure 7:
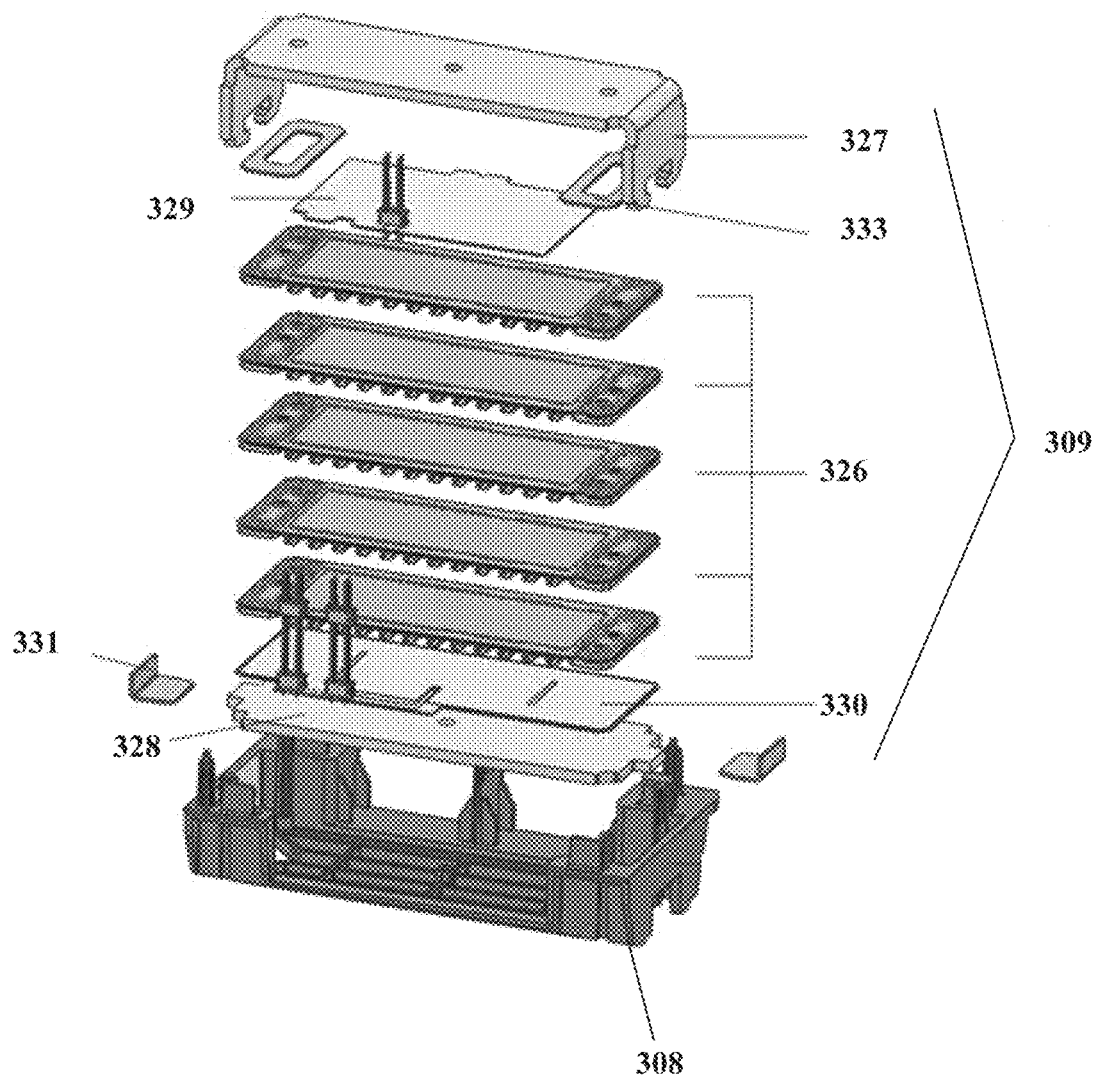
FIG. 7 shows a schematic diagram of an exploded view of the fuel stack of FIG. 6.

FIGS. 6 and 7 show the fuel cell stack assembly 309 and chassis clamp 308 in more detail. The fuel cell stack assembly 309 is based on polymer electrolyte membrane technology using platinum/carbon electrodes and converts hydrogen and oxygen from the air into water, DC electrical power, and heat. The assembly is cooled by natural convection from corrugated plates into an airflow created by fans 310. The fuel cell stack assembly 309 can comprise five individual fuel cells 326 that contain the membrane electrode assembly with carbon fiber gas diffusion layers and pre-coated bi-polar plates that are held together by adhesive gaskets. The fuel cells are compressed using stainless steel end plates 327 and 328 to reduce internal resistance. End plate 327 can be ported to provide hydrogen gas porting to the inlet valve 304 and a purge valve 303, with manifold gaskets 333 preventing leakage of hydrogen gas. The fuel cell stack assembly uses two gold/nickel printed circuit board based current collectors (an anode 329 and a cathode 330). The cathode printed circuit board 330 can use an integrated thermistor 332 (shown schematically in FIG. 2) to monitor the fuel cell stack assembly temperature. Shear locks 331 can be used to lock the end plates 327 and 328 in place after the stack assembly is complete.

Figure 8:
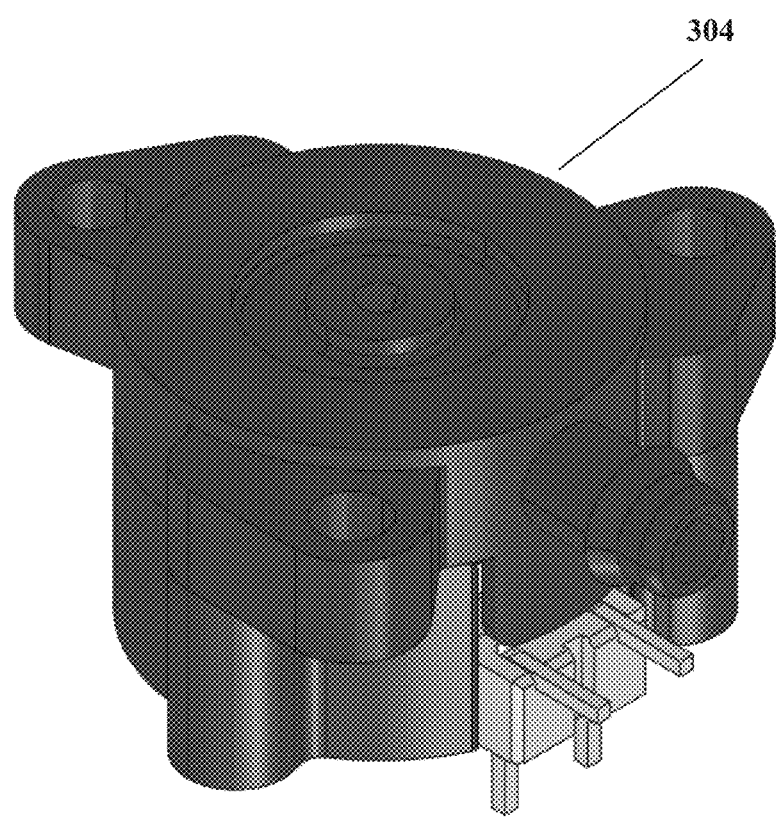
FIG. 8 shows an embodiment of an inlet valve suitable for use in a charging device.

FIG. 8 shows an external view of inlet valve 304. Inlet valve 304 can be a hydrogen solenoid valve, as a bi-stable latching valve designed to seal up to 830 mbar. The inlet valve 304 can be compatible with hydrogen gas supplied at a pressure of 2 to 7 pounds per square inch and at a rate of 75 cc/min. In practice, the inlet valve 304 is opened when the charging device 100 starts up and is closed when the charging device 100 is shut down.

Figure 9:
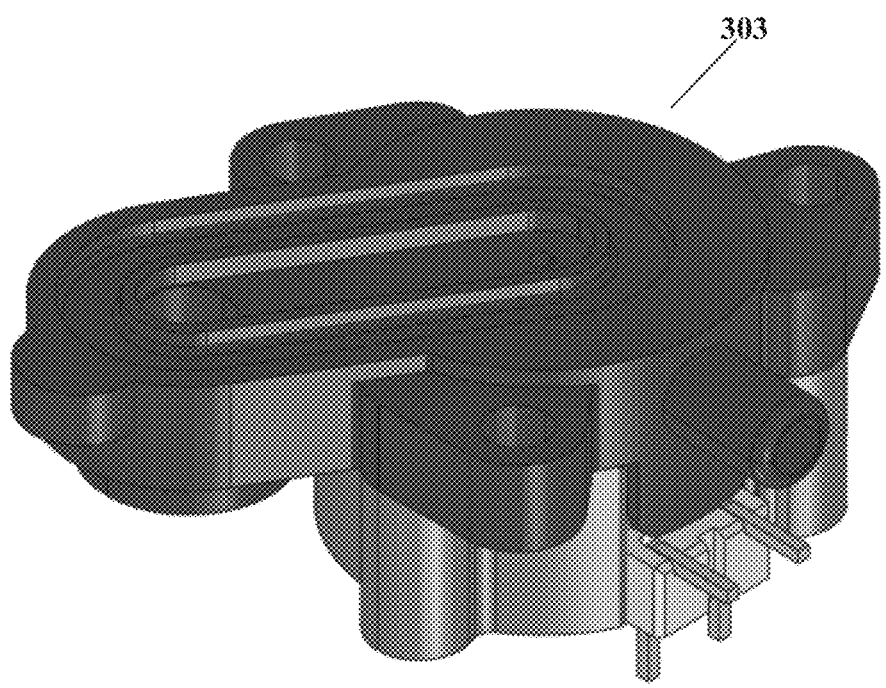
FIG. 9 shows an embodiment of a purge valve suitable for use in a charging device.

FIG. 9 shows an external view of purge valve 303, that can be a hydrogen solenoid valve, as a normally closed valve designed to seal up to 830 mbar. The software of the charging device 100 opens and closes the purge valve 303 to control the venting of water vapor from the fuel cell stack assembly 309. The duration and frequency of openings is controlled to ensure that the release of hydrogen is within desired emission limits, such as a limit of 0.016 g/hr as described in IEC 62282-6-100.

Figure 10:
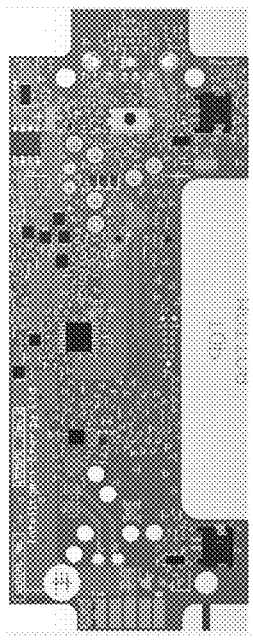
FIG. 10 shows schematic views of an embodiment of a printed circuit board assembly.
Figure 10:
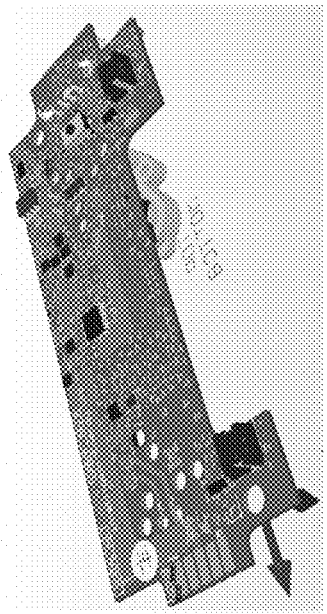
Figure 10:
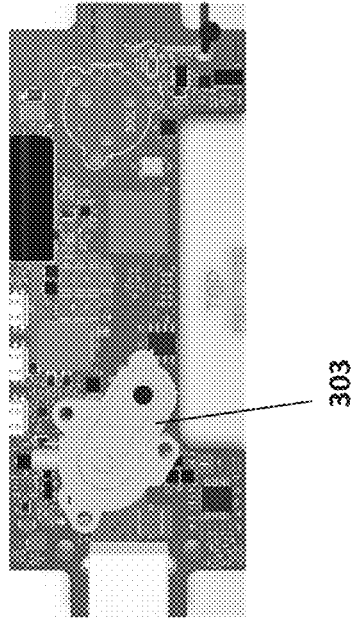
Figure 10:
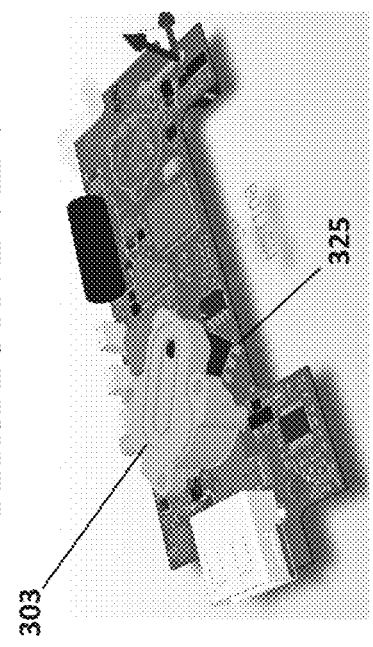

FIG. 10 shows an implementation of a printed circuit board assembly (PCBA) 312. The PCBA is a sub-assembly of the charging device 100 that provides all electrical control circuitry for the charging device 100 and all the peripherals including the external interfaces to the USB output, smart cover, and the user interface. Purge valve 303 is attached to the printed circuit board with a pressure transducer 325 hermetically sealed to the valve. The pressure transducer 325 monitors gas pressure at the exhaust side of the fuel cell stack assembly 309, generating an output voltage proportional to the gas pressure. The voltage is amplified and monitored by a printed circuit board assembly micro-controller. The pressure sensor can be one such as the commercially available models from Metrodyne Microsystem Corp. A micro-controller (STM 32) is fitted the PCBA that provides the overall functionality. A flash memory chip is fitted to the PCBA that is used to store or log error/fault data transmitted from the micro-controller. The Serial Flash Memory device is the Winbond SPI Flash, part number W25X2OCLSNIG. The memory capacity of this device is 2 Mbit, 256 K Bytes. The following should be noted regarding Silego hardware safety: all the safety actions are controlled by the hardware; the SW in the micro-controller provides unit functionality only; any system monitoring and safety functions can be implemented in one-time programmable mixed signal array ("Silego") devices, further described herein. A suitable PCBA can be supplied by Primax Electronics.

Figure 4:
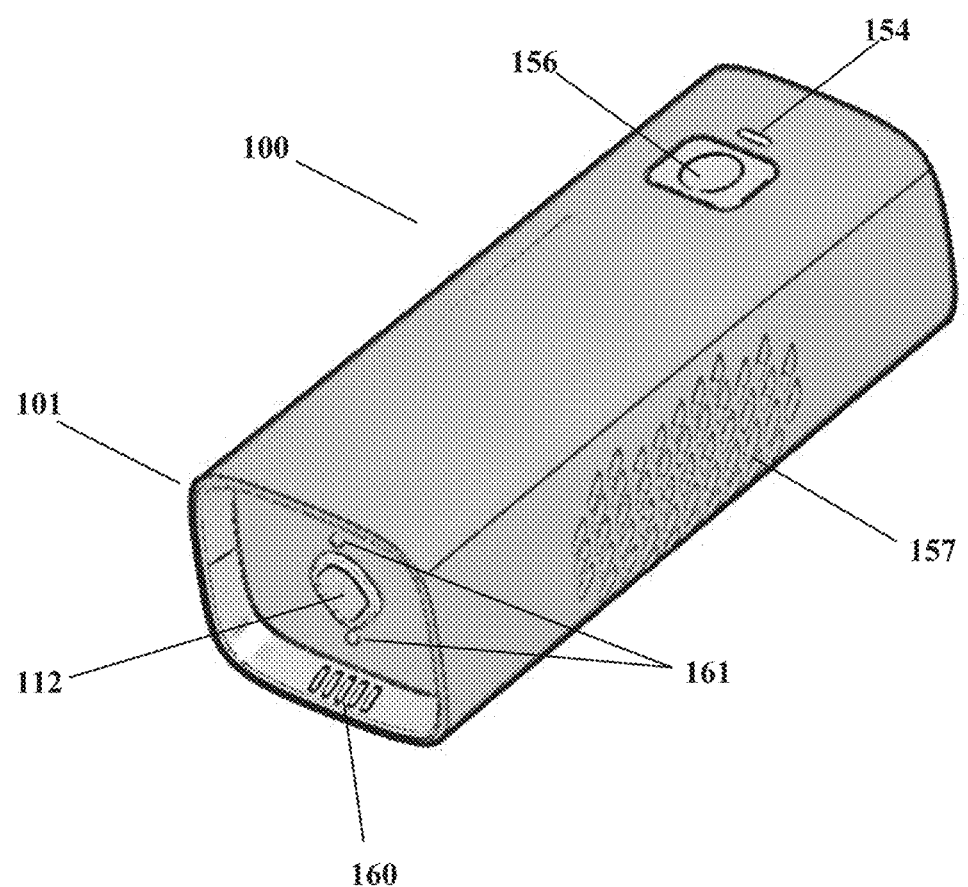
FIG. 4 shows an external view of a charging device including a fuel supply end.

In certain embodiments, charging device 100 has a hydrogen input end 101 as shown in FIG. 4. Hydrogen input end 101 can be adapted to attach to a cartridge 102, a smart hydrogen port cover 400, a "dummy" adaptor, or a mains adapter 410. A hydrogen inlet port 112 can receive hydrogen gas and is fluidly connected with the inlet valve 304 of charging device 100.

Figure 20A:
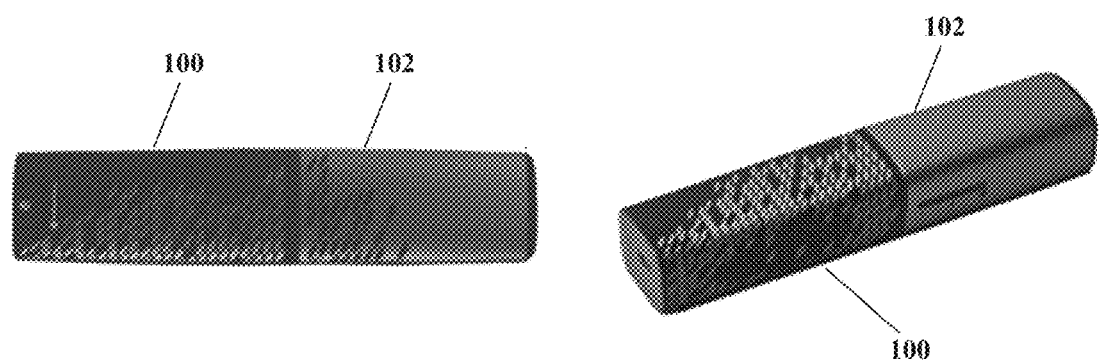
FIG. 20A shows an embodiment of an assembly of a charging device attached to a fuel cartridge.
Figure 20B:
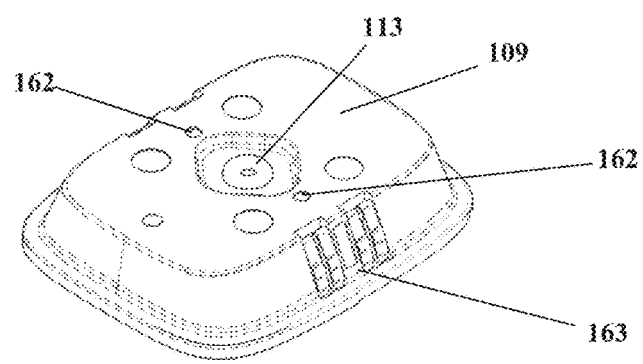
FIG. 20B shows a schematic diagram of an end of a fuel cartridge.

An external input connector 160 is configured to receive power input from a smart hydrogen port cover 400 or a mains adapter 410, and is configured for data communications with a cartridge 102. External input connector 160 is composed of 5-pins, 5V, 3.3V, SDA, SCL, and GND, and can be used for communicating with a serial EEPROM in a cartridge 102 over an r2c bus. Pins 161 or other suitable features can be incorporated into the hydrogen input end 101 to activate poppet valves 162 or other mating features on a cartridge 102 to permit the flow of hydrogen gas out of the cartridge 102. The features of one embodiment of a cartridge 102 are shown in FIG. 20B on mating face 109. A cartridge hydrogen output 113 fluidly connects with hydrogen inlet port 112 on the charging device hydrogen input end 101. A connector pin array 163 connects to external input connector 160. Mating face 109 covers magnetic coupling elements (not shown) within the cartridge that provide for magnetic connection between the charging device 100 and the cartridge 102, such that the cartridge can break away from the charging device 100 in case of an impact with minimal damage to the internal components.

Figure 11:
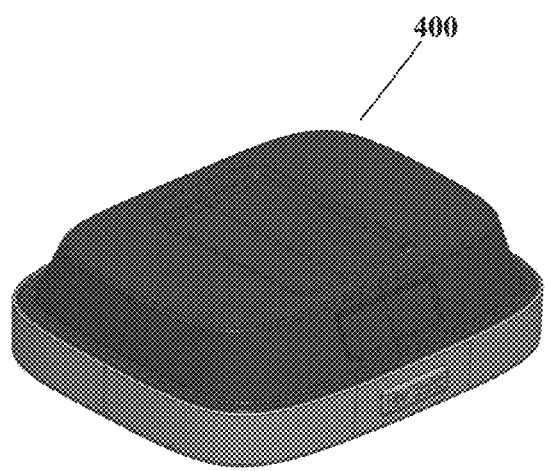
FIG. 11 shows an embodiment of a cover.
Figure 12:
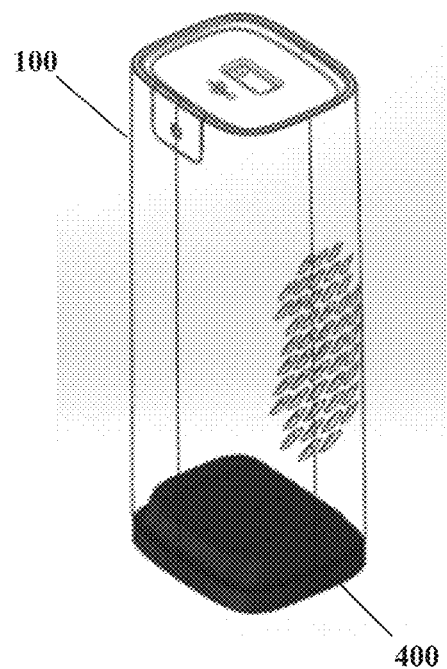
FIG. 12 shows a schematic of an embodiment of an assembly of a charging device with a cover connected to a fuel supply end of the charging device.
Figure 13:
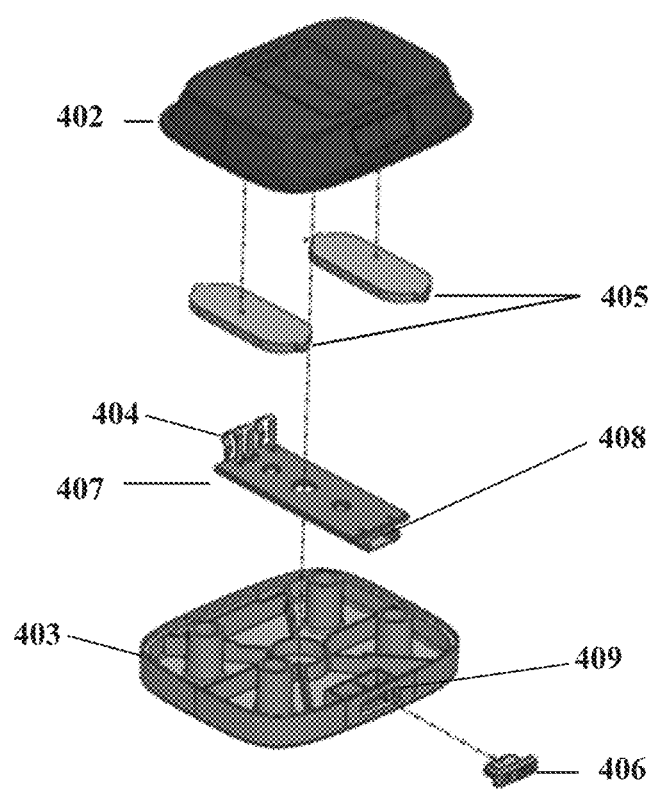
FIG. 13 shows an exploded view of an embodiment of a smart cover.

In one aspect of the invention, a smart cover 400, seen in FIGS. 11-13, or a dummy adaptor can protect the components of the hydrogen input end 101 from impact damage, prevent liquid and dust ingress into the charging device 100, and serve as a barrier to the internal magnets of the charging device 100 (limiting the magnetic field strength immediately adjacent to the hydrogen input end 101 to less than 1.25 Tesla to avoid attracting foreign metallic objects, such as paperclips, and reduce the risk of accidental erasure of data contained other devices such as in a credit card magnetic strip). The smart cover 400 has a retention pull force of 2-4 lbs (9-18N) against the charging device 100. An exemplary implementation of a smart hydrogen port cover 400 is shown in an exploded view in FIG. 13. A cover USB input 408 and controller 407 are housed within the upper shell 402 and the lower shell 403 of the smart cover, the USB input and controller have a smart cover output interface 404 which is accessible from the outside of the upper shell 402. The smart cover 400 is attached to the charging device 100 at the hydrogen input end 101 whereby the output interface 404 accessible on the smart cover 400 mates with the charging device external input connector 160. Additionally a fluid connection 409 through the lower shell 403 to the cover USB input 408, allows connection via the smart cover 400 to a USB connected power source 399 to charge the charging device battery 314. The fluid connection 409 can be covered with an optional bung 406 to protect the connection.

Figure 14:
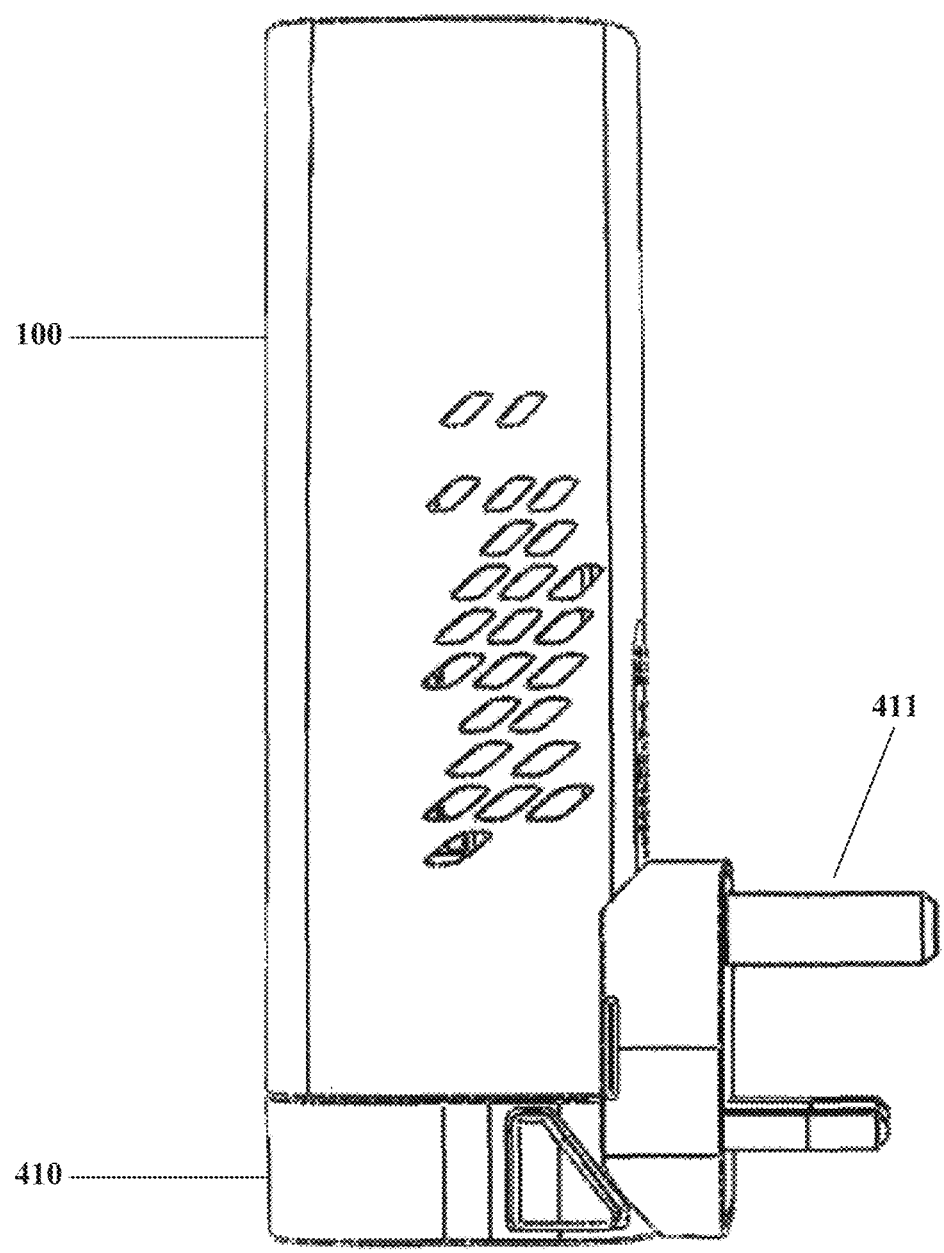
FIG. 14 shows a schematic diagram of a side view of a charging device with a mains adapter.

In another mode of operation, the smart cover 400 may be swapped out for a mains adapter 410, shown in FIG. 14, whereby said mains adapter has an interface 412 with the hydrogen input end 101 of the charging device, whereby power from plugs 411 which connect to alternating current at a wall socket passing such current through an AC to DC converter (not shown) provide a DC input from an electrical contact 415 (visible in FIG. 1) to the charging device's external input connector 160, whereby the battery 314 is recharged. In some instances, in this mode an output can be provided to the USB output of the charging device to also charge connected devices.

Figure 15:
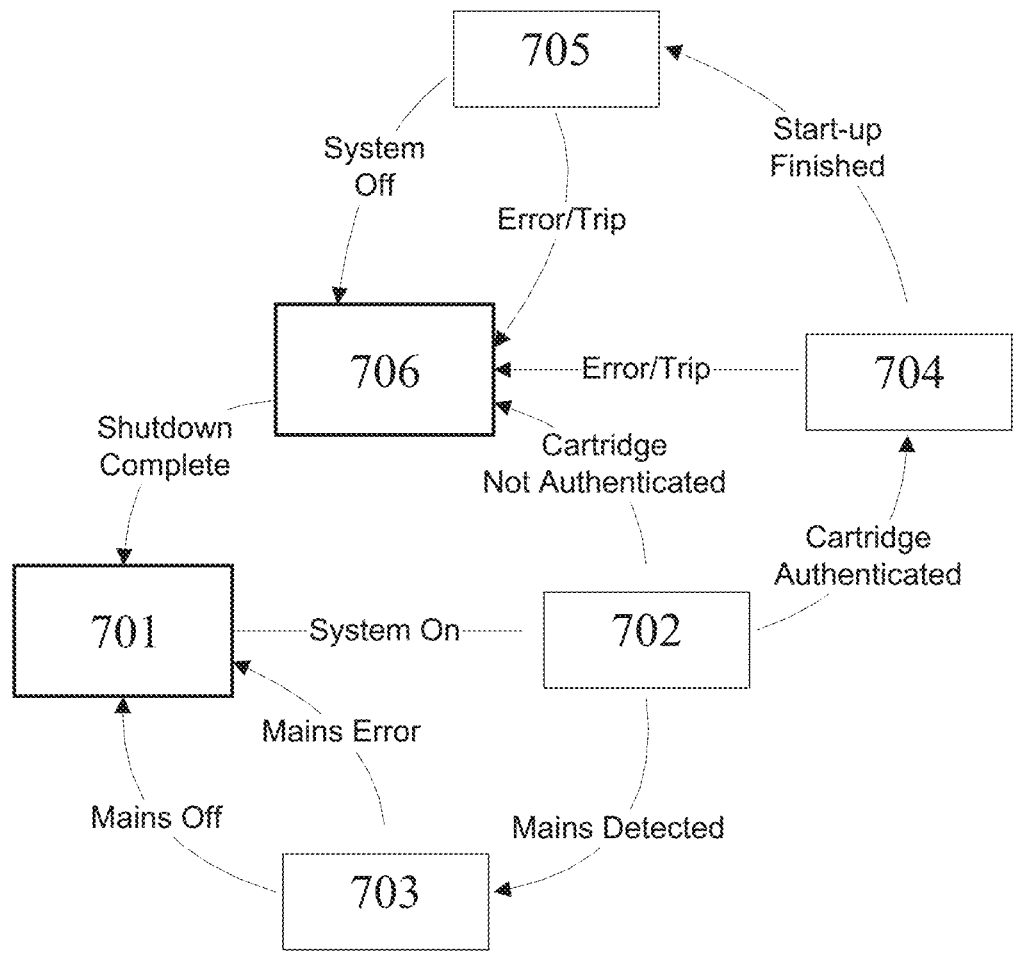
FIG. 15 shows a schematic diagram of an exemplary implementation of processes of a charging device.

Turning now to FIG. 15 which illustrates a system state diagram showing aspects of process flow through various stages of initialization and operation of the charging device and system. FIG. 15 shows the "Off" mode 701, whereby the system is in an interrupt or low power consumption state, with power disabled from all components until the system power is turned "on." Turning "on" may include a manual switch. In some instances, turning "on" may be via a timer or electronic based on sensor data. Once turned "on" power is drawn from the on-board internal battery 314 in order to enable the initialization of the system controllers 150. From the "Off" state, the system can transition to "Idle" mode 702, a state when the system controller 150 and components are awake and powered by the internal battery 314. If a source power supply and a device on the output 130 or 131 is detected, the controller determines the next state of operation. Idle also monitors for the presence of a connected cartridge 102, a USB connected power source such as smart cover 400 or power via the mains adapter 410. If the charging device 100 is not in test mode, the system controller 150 will progress to the "Mains" mode 703 to charge or power a connected device 200 via the USB output 130. In Mains mode 703, the charging device may also charge the internal battery 314. In some instances, the charging device will remain in mains mode as long as mains power is applied, regardless of whether a USB device is connected.

If there is a successful authentication of a hydrogen fuel supply, the controller proceeds to the "Stack Start-up" mode 704, wherein the charging device runs on the internal battery 314 power until the fuel cell stack 309 initialization and start-up process is complete. During stack start-up, a process of preparatory steps take place. Main steps include one or more of closing both the inlet valve 304 and the purge valve 303, and checking if the temperature is between about 5° and about 62° centigrade. If the temperature is outside this range, then the charging device utilizes the internal battery, opening an inlet valve enabling fans 310, and setting the fan speed according to the required stack temperature; opening the inlet valve 304; at least one pressure check; wait or hold until sufficient hydrogen pressure (at least 150 mBar) is being delivered to power the Stack; Purge operation; Leak check; Monitor the Stack voltage in order to determine if there may be any hydrogen leaks in the system. A leak check can be performed by monitoring the fuel cell stack voltage to determine if any hydrogen leaks are present in the system. If the fuel cell stack voltage falls below 2.0V within 10 seconds, then the charging device 100 detects a system leak error condition. If the fuel cell stack voltage remains above 2.0V then the start-up procedure continues.

Once the start-up process is completed the charging device can provide power from the Stack. This is called out in FIG. 15 as "Stack Running" mode 705. In this mode some of the operations the charging device may carry out are:
Charge the device(s) 200 connected to the output 130 or 131.
Carry out regular Purge and Fan Pulse/Hydrate operations to maintain an optimal level of water vapor in the stack. This operation includes switching off the fans and pausing or "short circuiting" the fuel cell Stack for a short period of time in order to boost the average fuel cell voltage. While the Stack is running, a Fan Pulse/Hydrate operation is performed every 180 seconds. During the hydrate operation, the charging device is powered from the internal battery.
Control the fan speed in order to maintain a target Stack temperature of 42° C. The Control uses a PID (Proportional-Integral-Derivative) mechanism to control the fan speed between 0% (Off) and 100%. The specific fan speed is calculated to maintain the required Stack temperature, which in some implementation is 42° C. When activated, the fans will operate at a minimum speed of 23%. The fan speed may also be activated at 100% during the Fan Pulse/Hydrate operations noted above.
Maintain the state of charge (SOC) of the internal battery. If the stack is producing a predetermined voltage battery charging is supported. In some instances that predetermined voltage is at least 3.2V.
Measure performance of the Stack within the system wherein the stack output voltage and current represent a measure the performance of the fuel cell stack.
Monitor at least some of the available ambient parameters to validate system health and performance.
Once in Stack running the charging device can remain on Stack power until it shuts down, except for the following circumstances when battery power is temporarily used:
(a) Low Stack voltage—the charging device battery blending mechanism is enabled to support the Stack output;
(b) During Purge operations—stack power is not provided during purge operations so the charging device switches to battery power; (c) During Pulse/Hydrate operations—these operations momentarily disable the stack so the charging device should switch to battery power.

In FIG. 15, "Shutdown" mode 706 is a process which engages when the charging device departs "Stack Running"

mode 705 if one of the following conditions is met: (a) the completion of charging of the device(s) 200 on the USB connection (i.e. when the USB load is below a certain level), or the device is disconnected; (b) a threshold check on one of the ambient parameters indicates an error condition; (c) a manual shut down instruction is provided i.e. a power button is held down continually for a period in excess of 3 seconds. Events that trigger shutdown, also referred to as fault condition thresholds, can include low fuel cell stack current, high USB current to the power-consuming device, low fuel cell stack voltage, high fuel cell stack temperature, low hydrogen pressure, high hydrogen pressure, low battery voltage, low fuel stack temperature, low hydrogen pressure during start-up, low mains voltage, the power-consuming device 200 is fully charged, low battery voltage, the power-consuming device 200 has been disconnected, no fan drive operation, low balance-of-plant voltage, and a fault in fuel cell stack thermistor. On detecting a shutdown event, the charging device carries out the following operations:
close the inlet and purge valves 304 and 303;
disable the fuel cell stack 309;
turn off the fan 310; and
disable the USB output 130 or higher power output 131.

One of the many functions of the charging device 100 is to provide charge current to an attached mobile device. If a device is connected which is "smart" wherein it can provide data about its energy requirements and charging parameters either directly or indirectly via model number or code, the system 100 attempts to access the device 200 via the data link 202 to identify the requirements of the device which may include establishing a data communications and enable the interface to a mobile application (App). Those of ordinary skill in the art will recognize that although a wired connection for data communication is described, it is within the scope of the disclosure that a wireless communication protocol may be used, and such would be within the scope of the disclosure. In some instances authentication of both the charging device 100 and device 200 is preferred. Acquiring data about the attached device is used to set or vary system parameters. In some instances identification of the device may be via memory in the charging device 100, a server 210 or a combination. In some instances, identification and data communication may be between the charging device 100 and device 200. In some instances the charging device 100 and/or the server 210 may be unable to specifically identify the device but are able to estimate or predict its power needs based on look up tables, database records, or sensing means within the charging device. Adjusting system parameters to match or predict a device provides a more responsive and/or efficient charging device.

Software can be used to operate and monitor the functions related to the fuel cell stack 309 including: opening and closing the inlet valve to allow hydrogen to flow into the stack; periodically disabling the stack and fan speed (and hence air flow) to increase the concentration of water vapor (pulsing); opening and closing the purge valve to release excess water vapor from the stack (purging); using the stack output voltage and current to measure the performance of the stack; and measuring the temperature of the stack and controlling the airflow to maintain an optimum running temperature. The essential stack control mechanism in software is to maintain an appropriate level of water vapor in the stack to facilitate optimal performance. This is achieved by carrying out regular fan pulse and purge operations. Subsequent to start-up, and the completion of the conditioning process, the cycle of fan pulse and purge operations is timed to occur at regular intervals: Pulse—a maximum timer of every 3 minutes or triggered from stack voltage (whichever occurs first); and Purge—400 ms every 300 seconds. Additional purge operations are also carried out if the hydrogen pressure value exceeds 800 mBar or the stack output voltage drops below 2.9 volts. This is because purging releases a small quantity of hydrogen gas to atmosphere; a Silego device is used to ensure the duration and frequency of purge operations is limited and total hydrogen release is kept within the Certification standards of 0.016 g/hr. The stack current value is also monitored by the software to assess stack performance. If the stack current falls below 0.1 A for 2 minutes, the unit is shut down. There is no upper limit check on the stack current value.

Software Architecture

Figure 16:
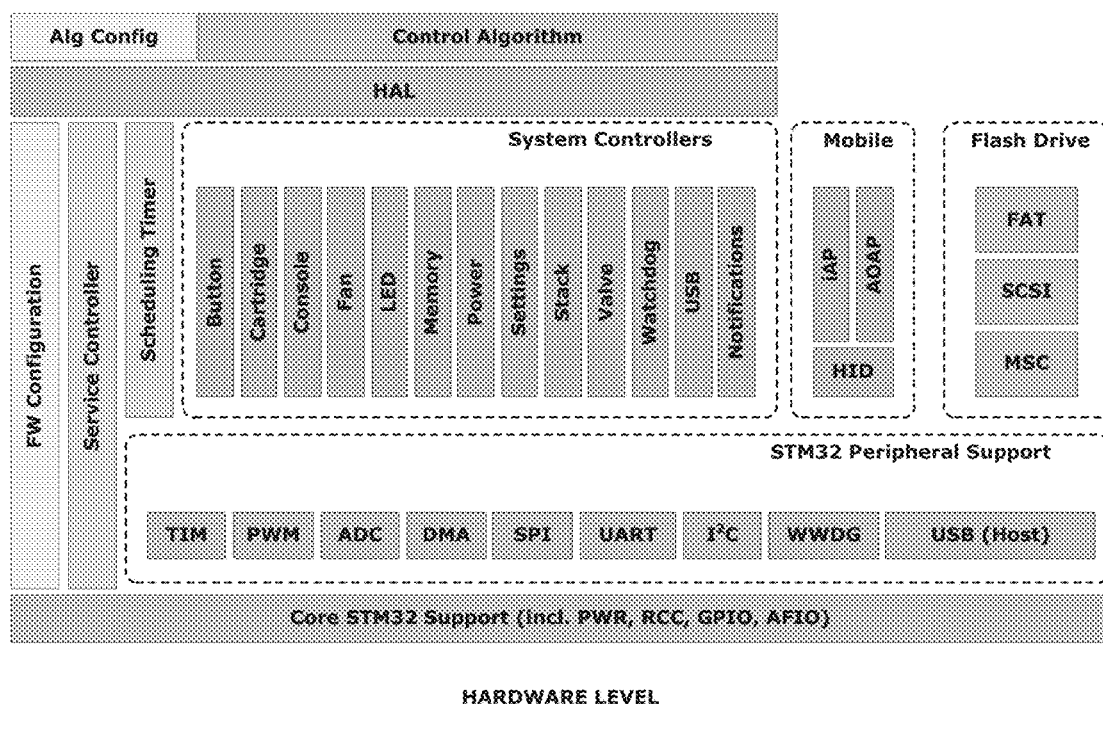
FIG. 16 shows a schematic diagram of an exemplary implementation of charging device software.

FIG. 16 shows a schematic diagram of an exemplary implementation of charging device software architecture. The charging device software architecture can be composed of the following software layers:
Core STM32 support.
STM32 peripheral support.
System controllers—modules that abstract the hardware into a set of meaningful system level components with a convenient interface.
Support for the USB communications interface to a mobile application.
Flash drive upgrade support over USB.
FW configuration—System firmware configuration support.
Service controller—to support co-operative multi-tasking.
A scheduling timer for soft-time scheduling and alarm support.
HAL (Hardware abstraction layer) providing an interface to the low level functionality for the control algorithm.
Control algorithm (and corresponding configuration)—controls the operation of the fuel cell and subsystems.

As seen in FIG. 16, the core STM32 support layer consists of register-level support as well as rudimentary support for the following functions:
GPIO—general-purpose IO configuration and management.
AFIO—alternate-function IO configuration.
RCC—reset and clock control—management of the system and peripheral clock.
PWR—support for system power and low-power mode.

As shown in FIG. 16, the STM32 peripheral level supports implementation of the more complex STM32 peripherals, including:
TIM—general timer support for the PWM timers and the scheduling timer.
PWM-PWM—configured timer support, used to support the LEDs and the fans.
ADC—Analogue to Digital Conversion support, used to support the processing of voltage, current, temperature and pressure values.
DMA—Direct Memory Access peripheral support, used to improve the IO efficiency of communications-based peripherals.
SPI—Serial Peripheral Interface, used to communicate with the serial flash memory.
UART—Universal Asynchronous Receiver Transmitter, used for both the debug interface and the cartridge interface (which uses the same pins as the cartridge EEPROM)
$I^2C$—inter-integrated circuit, used for communicating with the cartridge EEPROM and with the MFi authentication chip.
WWDG—Window Watchdog—used for protection against software lock-ups.

USB (Host)—support for the charging device as a USB host. This is built on top of the USB OTG (on-the-go) library, and is used to support mobile communications and software update via flash drive. The device operates as a USB host as only host devices provide power. The device is USB 2.0 compliant. The USB enumeration is common for all attached peripheral devices. The charging device must support the following classes of peripheral device: HID and MSC.

As depicted in FIG. 16, the system controllers implement the higher level functions of the charging device 100, and utilize the underlying STM32 peripheral libraries as well as the scheduling timer, the service controller and the firmware (FW) configuration. The controllers are:

Button—support for detecting button press, hold, and release events.
Cartridge—support for cartridge configuration (UART or I2C), Cartridge EEPROM communication and cartridge authentication.
Console—support for debug UART configuration and for console-level command handling.
Fan—support for fan speed control.
LED—support for LED color and pattern selection and for LED activate/deactivate.
Memory—support for serial flash memory access and partition-level communication—Power-support for power-source (mains/stack/battery) transitioning, battery charge support, and power source enabling.
Settings—support for non-volatile, static and system data storage settings.
Stack—support for stack enable/disable and purge/fan pulse functions.
Valve—support for opening and closing the H2 inlet and purge valves.
Watchdog—support for the software window watchdog.
USB—support for USB enable/disable, charge port control and calibration.
Notifications—support for interrupts (notifications) that facilitate a more rapid software response to important system events.

As shown in FIG. 16, a mobile application communication support layer, "Mobile" can implement communication with Apple and Android devices. The communication with Apple devices uses the iAP protocol over the HID interface and supports iOS V 4 and above. The iAP protocol is implemented using a MCU manufacturer provided MFi (Made For iPod/iPhone) library. The communication with Android devices uses the AOAP (Android Open Accessory Protocol) over the HID interface and supports Android v3.1 and above. This communication is not exposed through the HAL, so it is not controlled by the Control Algorithm. A mobile application (App) allows mobile devices to communicate with the charging device 100 via the USB interface. Once the mobile device 200 has been connected to the charging device 100, the App reads and displays the following data from the charging device: hardware/software Version Numbers; charging device usage data; details of cartridge history; details of stored fault history.

The App can also optionally access a web-site or web-server via a wireless connection so that the user can order replacement cartridges.

Flash drive upgrade support over USB requires FA T1 6 or F AT32 file system communication via SCSI protocol using USB MSC, on the USB Host. This communication is not exposed through the HAL, but carried out automatically by the USB controller when a suitable device is detected.

Also shown in FIG. 16 are firmware (FW) configuration support and a service controller. A Service Controller can manage a set of cooperatively-multitasked (proto-threaded) components, supplying single or repeat servicing, rudimentary prioritization and critical service completion prior to shutdown/standby low-power entry. Compile-time firmware configuration can be supported in a config/config.h file that affects a number of components.

A scheduling timer can be a counter-based timer with queue management and a millisecond-based period. Components are able to set up a scheduled event or series of events with the scheduling timer to receive call-back handling upon expiration.

The Hardware Abstraction Layer (HAL) provides the control algorithm with a simplified interface to the physical hardware of the MCU. The HAL calls down to the lower-level system controllers to perform its tasks with minimal points of access up to the algorithm. This reduces the number of dependencies between the control algorithm and the hardware.

The control algorithm can implement the strategy by which components of the system are managed and controlled. The control algorithm accesses the low-level hardware controllers via the HAL.

Charging a Connected Device

The following exemplars are a set of conditions which are applied to control the available charge current. Those of ordinary skill in the art will recognize that the sets of conditions may vary under different conditions—however that variation is within the scope of this disclosure.

For example, different devices have different charge current requirements.

Android devices typically charge at around 500 mA, whereas iPhones can draw up to 1 A. A Stack can generate a USB charge current of up to 1.2 A. The charging device can control the available charge current depending on the health of the Stack and the needs of the device 200.

A hardware current limiter can be employed to switch between Low Power and High Power modes. For example, if the Stack has not been conditioned or the internal battery voltage is less than a pre-set limit, then the maximum charge current available may be reduced. This is Low Power mode. In some instances, if the Stack has not been conditioned or the internal battery voltage is less than a 3.9V, then the maximum charge current available is 500 mA. If the Stack is conditioned and the internal battery voltage is greater than 4V then the Low Power mode restrictions may be lifted. In some instances charging up to and above 1 A is available. This is High Power mode. However, if a device attempts to draw a USB current in excess of predetermined maximum then the charging device 100 may be set, via its controller(s), to dial down to a Low Power mode. For example if a device attempts to draw 1.1 A the charging device can switch back to Low Power mode and limits the charge current to 500 mA.

In some exemplary implementations the charging device software applies the USB charge control in the following manner. A device such as iPod™/iPhone™/iPad™ is connected and a request is provided to the device via the iAP interface protocol. This indicates a charge level (above the base level of 500 mA) that is available to the device. For Low Power Mode this is provided as 0 mA, i.e. no additional charge. For High Power mode this is provided as substantially 500 mA. For a device (Android™ OS or other handset maker), the appropriate USB charge mode is enabled to select the available current level. A Low Power mode, by selecting SDP mode, is available to limit the charge current to 500 mA. A High Power mode, by selecting CDP mode, can extend the charge current above 1 A.

Battery Blending

Where the fuel cell stack voltage is not sufficient to support the power and charging requirements of the system, the internal battery 314 is utilized to provide supplementary power. This process is known as Battery Blending (load buffering). Battery blending can include a blending which normalizes the power supply to the device(s). For battery blending the Stack voltage value is monitored frequently. In some instances, the frequency may be about every millisecond. Monitoring is to determine the health of the fuel cell stack and/or the availability of hydrogen to the Stack. Those of ordinary skill in the art will recognize that the timing and frequency of the monitoring of these system parameters may vary depending on the intended use and other factors such as temperature, pressure, humidity and location of the system. In one exemplary situation for loads of 700 mA and below, battery blending is employed if the fuel cell stack voltage is below 3.2V. For loads of above 700 mA, a fuel cell stack voltage 3.1V threshold may be utilized. These adjustments of system parameters for battery blending and efficient battery blending may also be varied depending on variable such as specifications devices being charged, user activity, temperature, pressure, humidity, location, and the like.

During battery blending, the charging device can alternate between providing power from the battery and providing power from the fuel cell stack (also referred to as "Stack"). One benefit of the battery blending mechanism are that it reduces the load on the Stack if it is struggling to support the full load thereby avoiding system shutdown. Manages deficiencies in the Fuel Cartridge response such as periods of low pressure. Runs the Stack more efficiently by managing its effective current draw. Short pulses of fuel cell stack current (high frequency switching) allow the system to take advantage of the fuel cell stack bulk capacitance to overcome mass transport limitations. This may improve efficiency by sustaining a higher fuel cell stack voltage.

Figure 17:
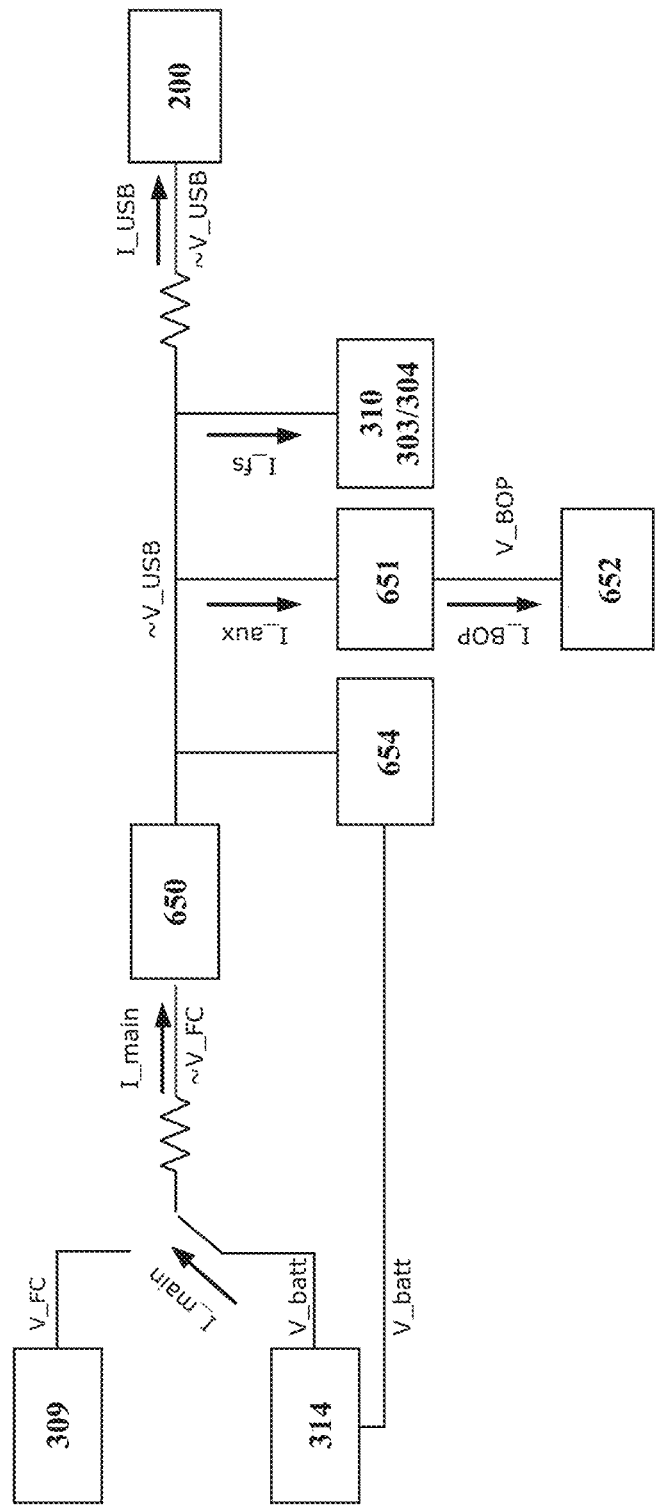
FIGS. 17, 18, and 19 show schematic diagrams of power flow in different operational processes of a charging device.
Figure 18:
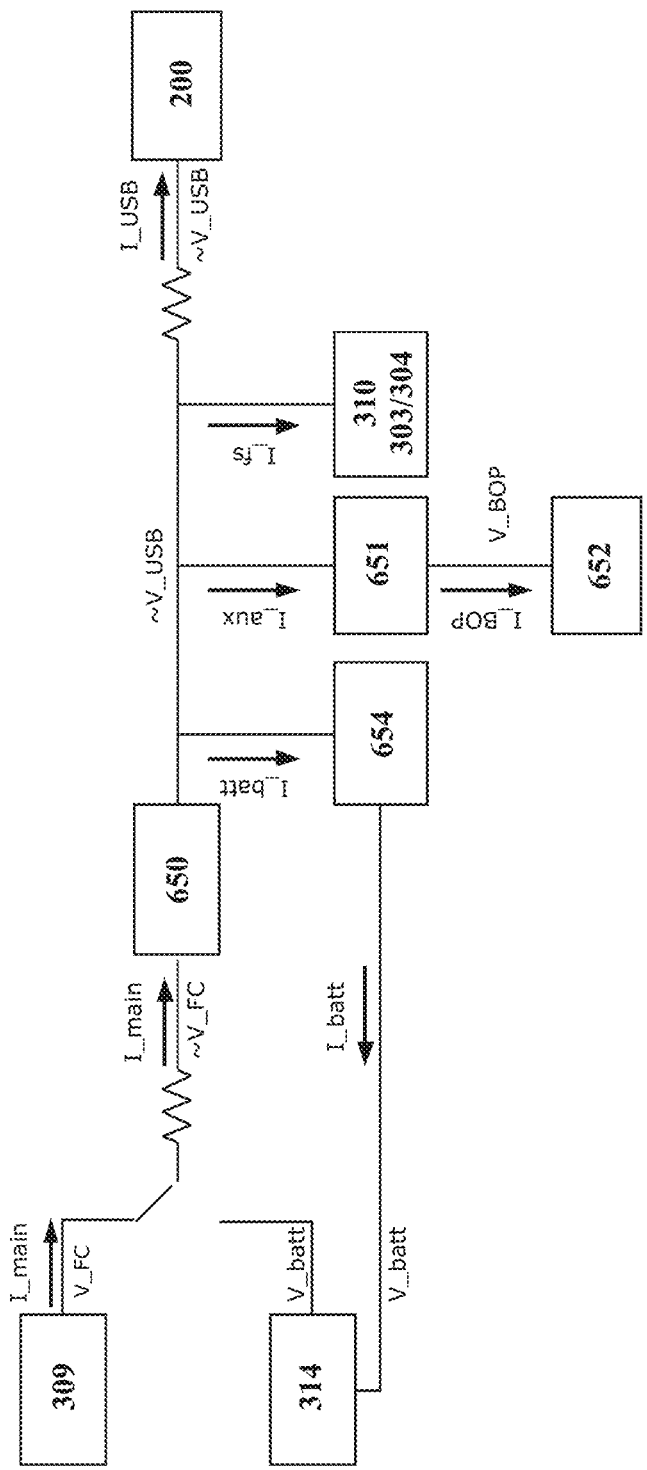
Figure 19:
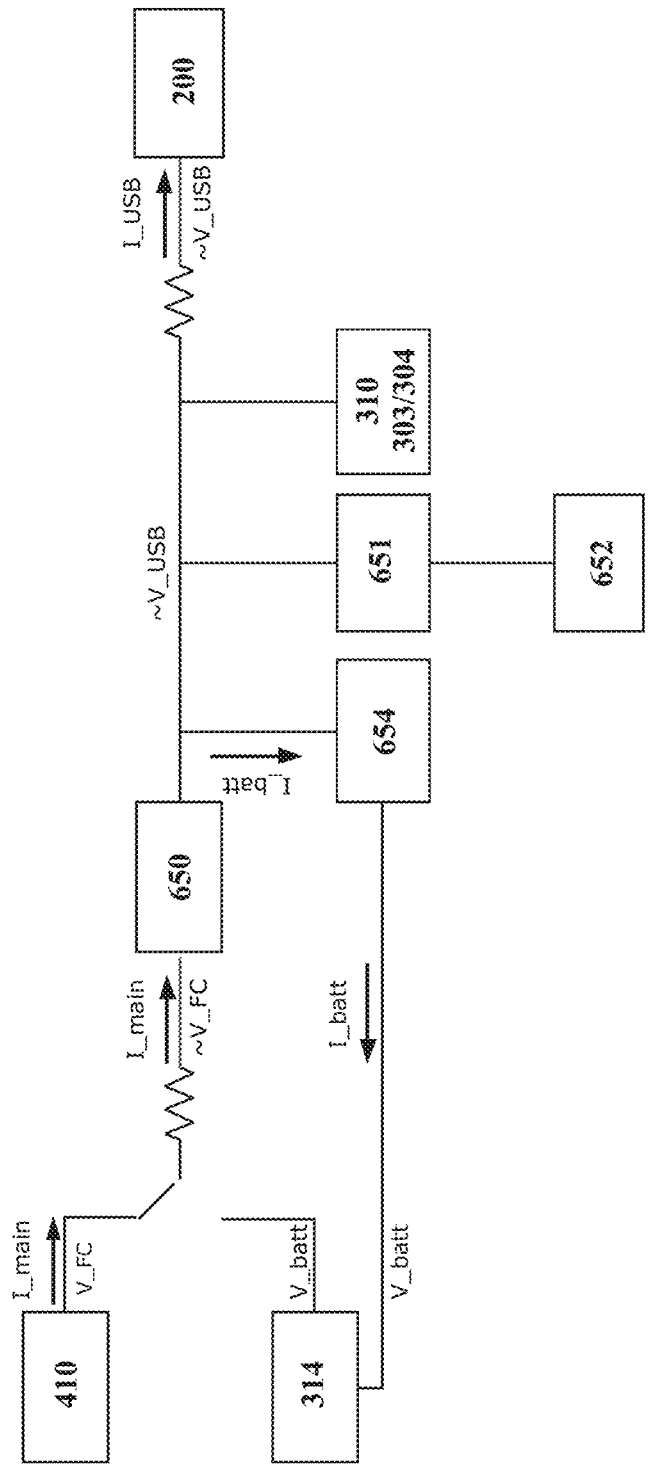

Turning now to FIGS. 17-19 mode diagrams are illustrated. FIGS. 17 and 18 show schema used in battery blending. The alternating between battery and fuel cell is roughly analogous to a pulse width modulation for speed control. Very fast switching on and off of one of the fuel cell mode and the battery mode results in the appearance of a constant flow of power although at a millisecond level the flow is a series of stop start on-off source fuel cell-source battery.

In one mode (FIG. 17) the internal battery 314 may be used to supply power to the DCDC converter 650 whereby the power is distributed to a low drop out voltage regulator 651 and then to the balance of plant (BOP) 652. Power is also provided to the fans 310 and valves 303/304 and to any attached device(s) 200. In another mode (FIG. 18) the fuel cell stack 309 is used to supply power to the DC-DC converter 650 whereby the power is distributed to a battery charger 654, a low drop out voltage regulator 651 and then to the BOP 652. Power is also provided to the fans 310 and valves 303/304 and to any attached device(s) 200. In another mode (FIG. 19) a mains adapter 410 and AC-DC converter (not shown) are used to supply power to the DC-DC converter 650 whereby the power is distributed to a battery charger 654, a low drop out voltage regulator 651 and then to the BOP 652. Power is also provided to the fans 310 and valves 303/304 and to any attached device(s) 200.

A one-time programmable mixed signal array, also referred to as a "Silego," can provide complex mixed signal functionality without the need for software to control safety requirements.

One exemplary charging device electrical system utilizes three Silegos. The first Silego is used to control the H2 inlet valve—monitors fan drive signal and VBOP. If either the fan drive signal ceases for more than 10 seconds or VBOP falls below 3.96V or the stack temperature rises above 68° C., then the inlet valve closes and the stack operation shuts down. The second Silego is used to control the power source selection to the DC-DC converter. This ensures only one source is selected at any time regardless of the state of the output signals from the micro-controller. The third Silego is used to control the purge valve by limiting the duration and frequency of valve opening. This ensures that the level of hydrogen emitted remains within safe limits under normal operation and under single faults conditions. It also monitors the stack thermistor—if it fails open or short circuit, the inlet valve closes and the system shuts down.

Figure 21A:
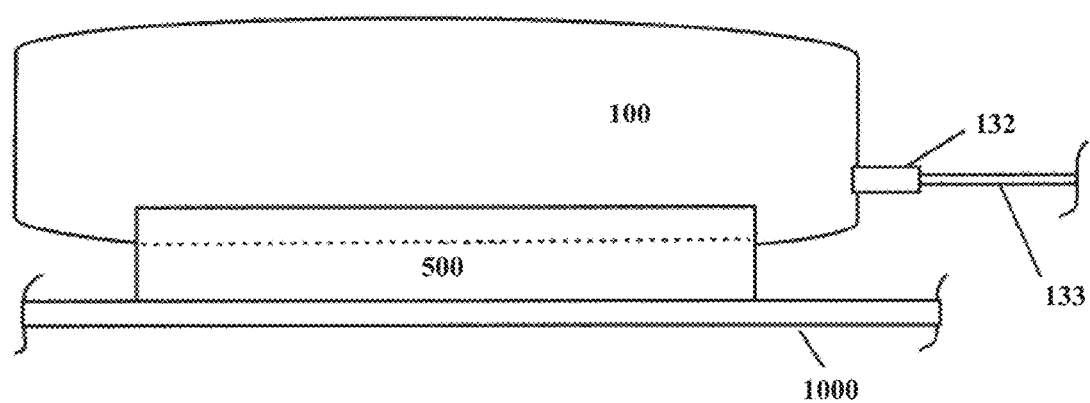
FIGS. 21A, 21B, and 21C show schematic diagrams side, end, and bottom views of an embodiment of a charging device in a configuration for airflow optimization.
Figure 21B:
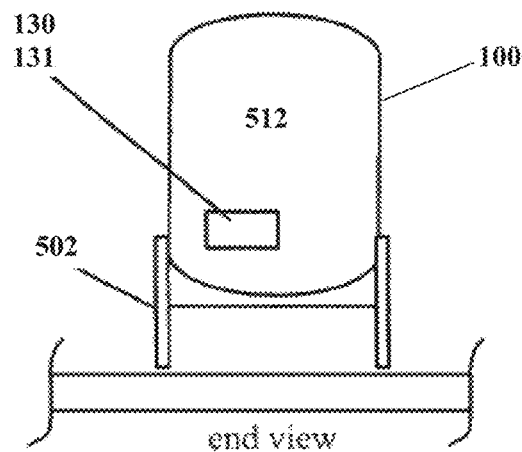
Figure 21C:
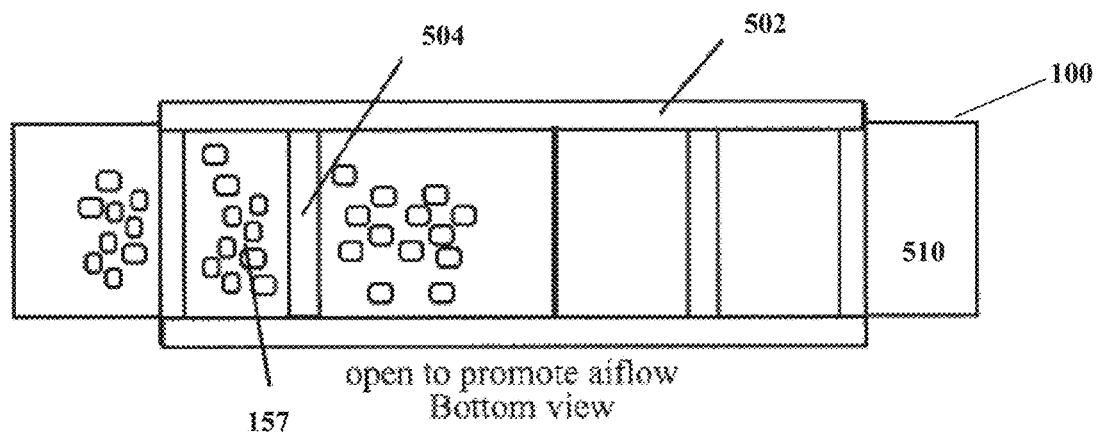

FIGS. 21A-21C show a charging device with airflow optimization. The charging device 100 may be raised off a surface 1000 via a stand 500. A stand with legs 502 can have slats 504 to allow a portion of the bottom 510 of the charging device to be uncovered. The charging device 100 has air vents 157 and such a stand will limit obstruction as opposed to placing the charging device side or bottom down on a surface. The output may be via connected USB 132 cable 133 inserted into output 130 shown at top 512 of the charging device. For higher power requirements a connection (not shown in FIG. 21B) is made to the higher power output 131.

Figure 22:
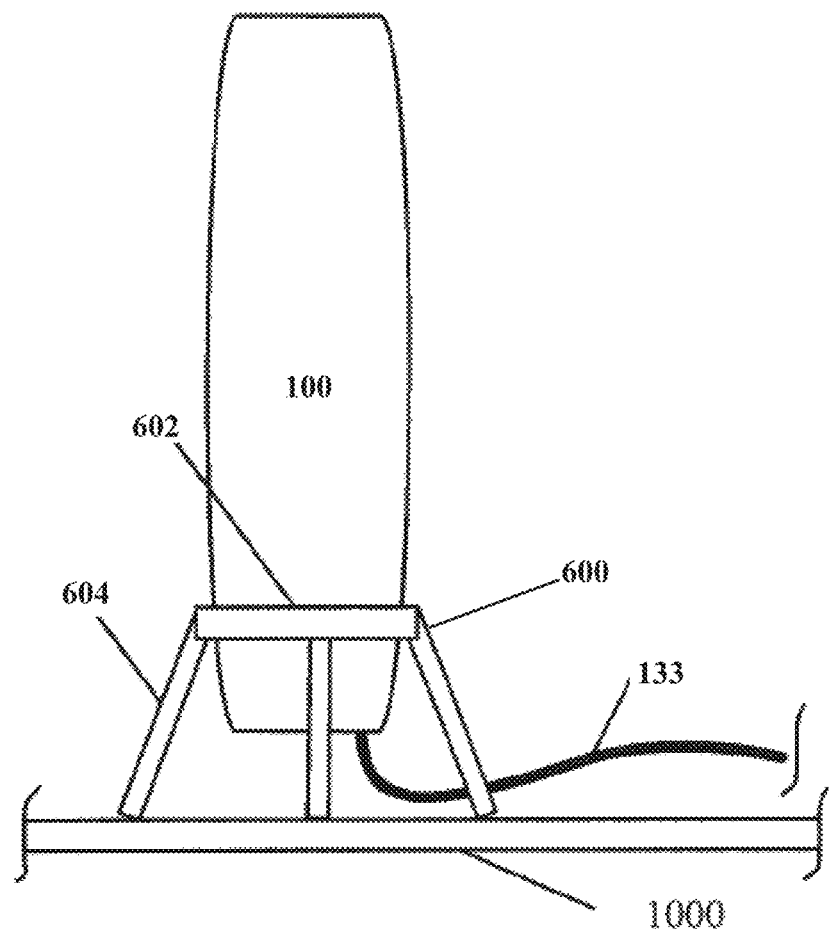
FIG. 22 shows a schematic diagram of a charging device positioned in a stand device.

FIG. 22 shows a tripod stand 600 whereby a charging device 100 is positioned end up via a waist support 602 which holds the charging device snugly, but removable, at a position above a surface 1000 via a multitude of legs 604 extended rom said waist support 602.

Figure 23:
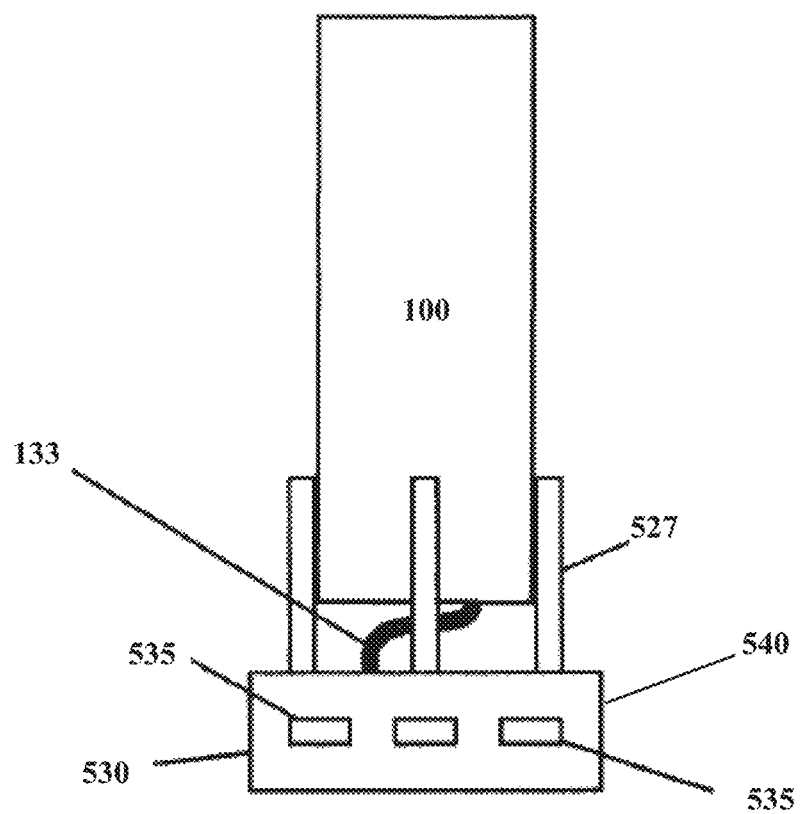
FIG. 23 shows a schematic diagram of a charging device positioned in a stand device that incorporates a hub.

FIG. 23 shows a stand 540 whereby a charging device is positioned end up via arm support 527 which holds the charging device snugly, but removably, at a position above hub 530. The hub 530 provides control circuitry whereby the USB output 131 is split into multiple outputs 535.

Figure 24:
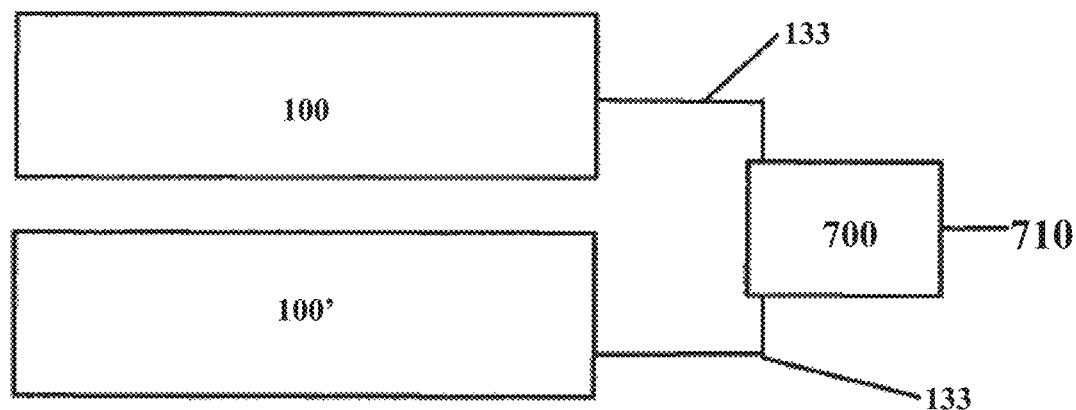
FIG. 24 shows a schematic of an assembly of multiple charging devices working in combination.

FIG. 24 is a schematic of a gang of charging devices. The illustration of two charging devices is not a limitation and adding additional charges in series or in parallel is within the scope of the disclosure. Multimode operation may be provided in some exemplary implementations. Charging device "A" 100 and charging device "B" 100' each have a power output 131 and are connected to a Bus 700. The Bus may connect the charging devices in series or in parallel, or may be switchable between the two. Connecting a plurality of charging devices in parallel can be useful for increasing the amperage, while an in-series configuration can increase the voltage. The Bus output 710 will reflect the mode.

LED 154 can provide the user with status information about the charging device 100 and/or cartridge 102 and provide confirmation to the user that the desired action is being taken by the charging device 100 in response to the user pressing/holding/releasing power button 156. In one implementation, the charging device can be configured to support the following power button press events: an "initial hold" of less than or equal to 1.5 seconds leads to no action by the charging device 100; a "short hold" of 1.5 to 3 seconds causes the charging device to turn on and begin start-up processes; a "medium hold" of 3 to 6 seconds causes the charging device to turn off and begin shut-down process; and a "long hold" of over 6 seconds causes the charging device to reset. LED 154 can be a multi-color LED, such as one that is capable of displaying green, yellow, and red light in display patterns. A "flash" display pattern can be used, wherein the selected color will be displayed at 100% intensity for 2 seconds, followed by being off for 1 second. Alternatively, a "breathe" display pattern can be used, wherein the LED color fades from being off to 100% intensity and then back to off over 3 seconds, then remains off for 1 second. Alternatively, a "blink" display pattern can be used, wherein the selected color will be displayed at 100% intensity for 1 second, followed by being off for 0.5 second. Through the selection of one of a plurality of colors and one of a plurality of display patterns, one of many different charging device states can be communicated to the user. These charging device states can relate to the status of the internal battery 314 charge level.

Figure 25:
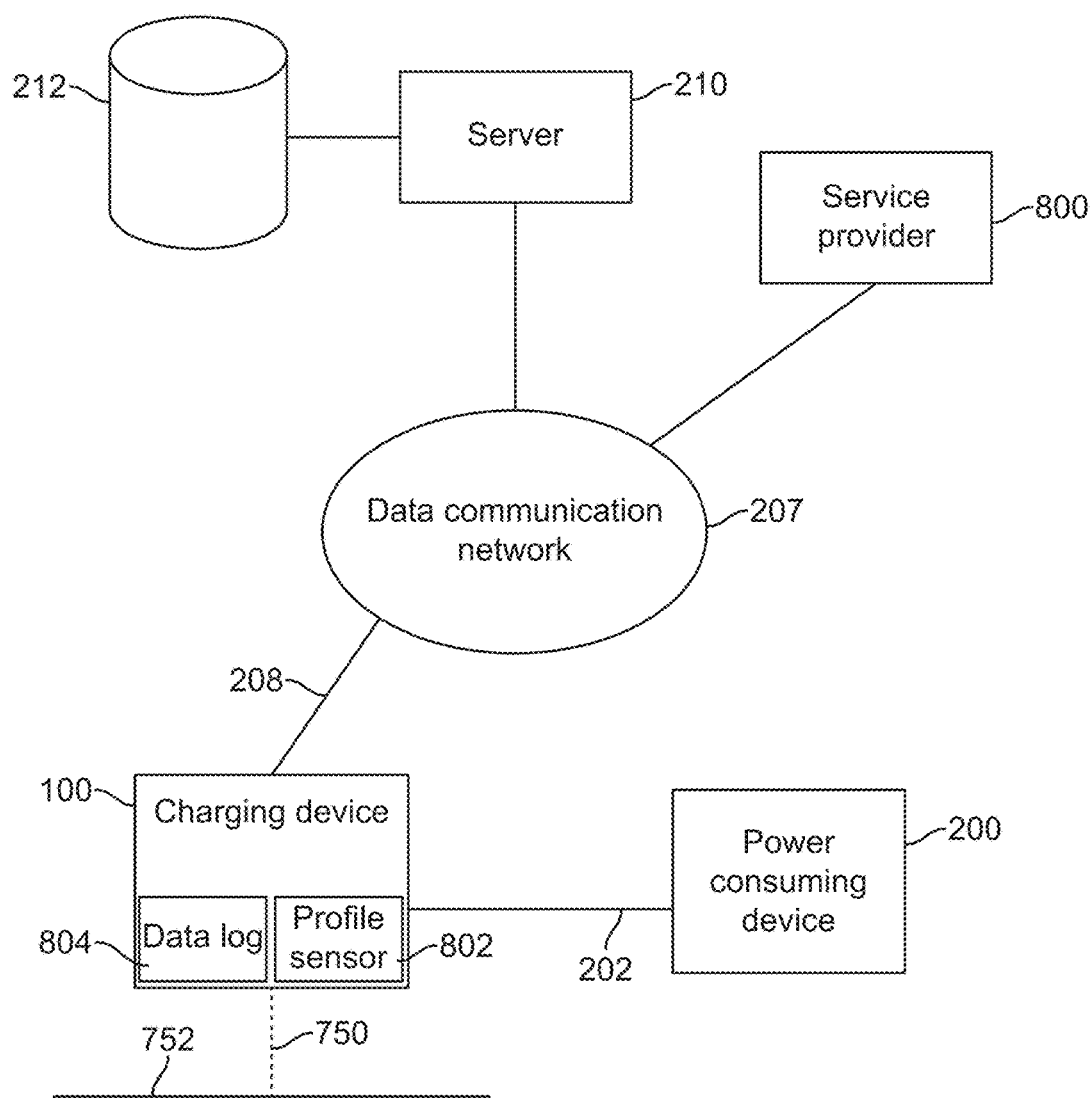
FIG. 25 shows a schematic diagram of a data collection related to charging a power consuming device.

With reference to FIG. 25, a charging device 100 is periodically connected to a power-consuming device 200 by way of a detachable or otherwise disconnectable charging and data link 202. The charging device 100 is connected, via a data link 208 and data communication network 207, to a server 210 having a database 212.

The charging device 100 may comprise any device capable of supplying power to a portable power-consuming device 200 in sufficient quantity to facilitate recharging, or at least partial recharging, of a battery or other charge storage device in the power consuming device 200, or for powering the power-consuming device for extended periods of normal operation when auxiliary power is available. The expression 'charging device' may therefore encompass devices commonly referred to as power adaptors. The expression 'recharging' is intended to encompass any form of providing electrical energy to a storage device capable of storing energy for later release and may include regeneration of device in which chemical reaction takes place. In some instances the device 100 is a fuel cell power source, e.g. a hydrogen-powered proton exchange membrane fuel cell system capable of generating electrical power for recharging a power-consuming device 200 or for generally providing auxiliary power thereto. In other instances the charging device 100 could be a mains power adaptor for converting the domestic mains or line voltage from a high voltage alternating current to a low voltage direct current suitable for recharging or powering the power-consuming device 200. The charging device 100 could comprise a DC-DC voltage converter for use in, for example, a vehicle taking its input from a 12 or 24V vehicle electrical system and providing a low voltage direct current suitable for recharging or powering the power-consuming device 200.

The power-consuming device 200 may comprise any portable, self-contained and/or autonomous device which relies on an internal, rechargeable power source for operation which must be periodically recharged. Particular examples of such power-consuming devices include: mobile telephones including so-called 'smart phones'; personal computing devices including notebook computers, netbooks, tablet computers, personal digital assistants, etc.; entertainment devices such as music players, game playing devices or consoles; electronic books or 'e-readers'; video players, etc.; cameras or video recording devices; and many other items commonly referred to as consumer electronics.

Figure 26:
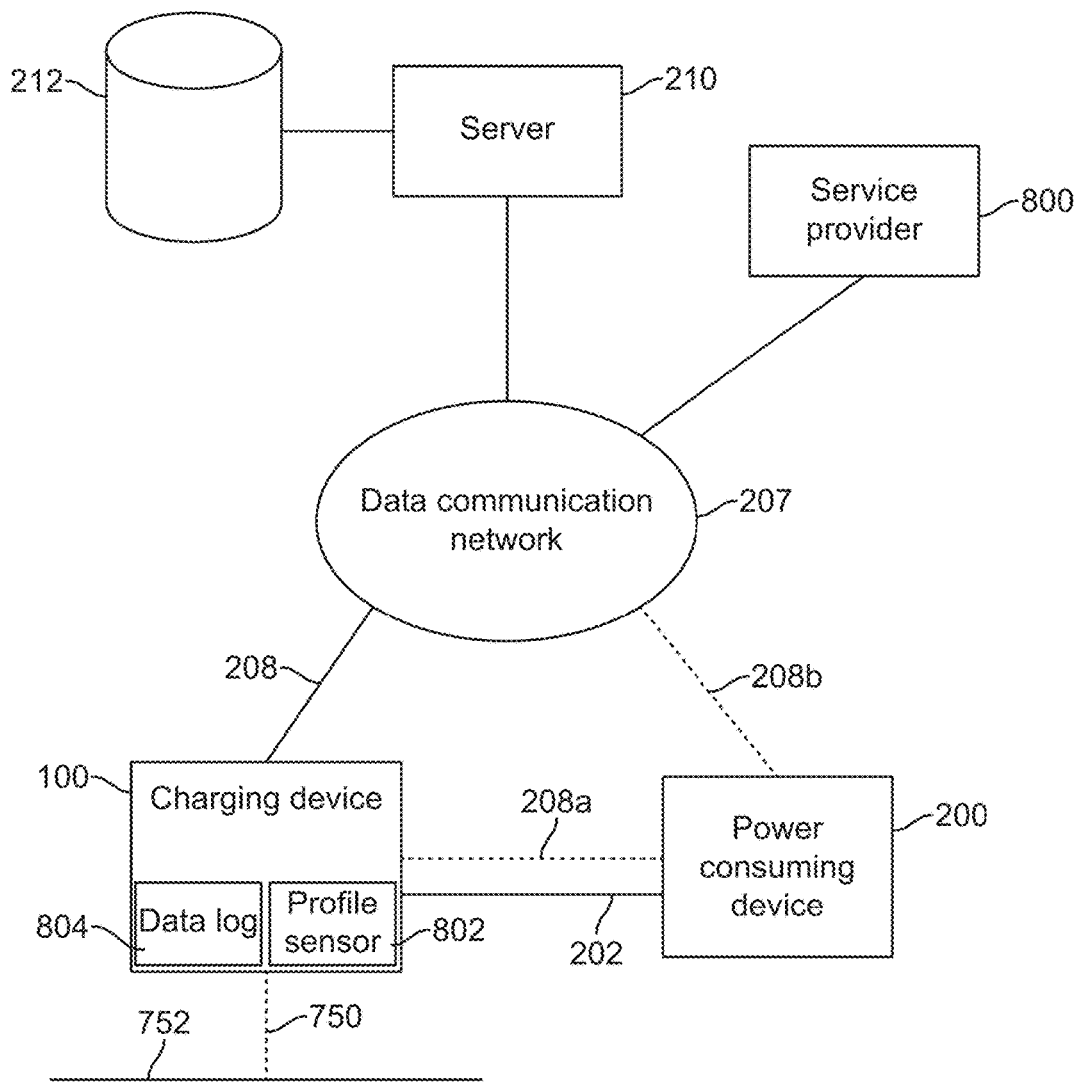
FIG. 26 shows a schematic diagram of a data collection related to charging a power consuming device.

The charging device has a permanent or an intermittent data link 208 in signal communications to a data communication network 207. The data communication network 207 may be the Internet or a local area network, for example. The data link 208 may be a wired connection or a wireless connection, using any suitable technology and transport protocol. For example, a short range wireless connection to a local WiFi router may be used for data link 208. Alternatively, a power connection 750 (shown as a dashed line) to a utility power line 752 could be used for data transfer to a router connected to the utility power line and to the network 207. In another arrangement (shown in FIG. 2), the power-consuming device 200 itself may provide the data link between the charging device 100 and the network 207. This arrangement is shown in FIG. 26 as link 208a (i.e. the charging and data link 202) and a communication channel 208b between the power-consuming device 200 and the network 207. In such an arrangement, the direct link 208 between the charging device 100 and the communication network 208 could be omitted. In other instances, the data link may be separate from the charging link. In yet other instances, the data may be transmitted back via the mains (or other low voltage network, for example, a telephone network), Ethernet, or other low voltage wired systems.

In a particularly convenient arrangement, where the power-consuming device 200 is a mobile telephone, the link 208a may comprise a USB cable and the communication channel 208b may comprise a cellular telephone network. In such an arrangement, communication between the charging device 100 and the network 207 and server 210 can conveniently be controlled by an application program loaded onto the power-consuming device 200 (e.g. smart phone).

The data link 208a could be the combined charging and data link 202 itself (e.g. USB cable), or the data link 208a could be separate from the hardwired charging link 202. In this respect, the data link 208a could be a short range wireless communication channel such as Bluetooth.

The server 210 may be any suitable remote computing resource including a database 212 which is capable of receiving data relating to the relationship between the charging device 100 and the power-consuming device 200 as will be explained in more detail below. The server 210 is preferably capable of managing data received from many such charging devices 100, the data relating to relationships between the many such charging devices 100 and the power consuming devices to which they are periodically connected. The server 210 may be capable of aggregating data from these many relationships and providing the data to other entities such as one or more service providers 800.

The charging device 100 includes a profile sensor 802 which may be configured to collect environment data relating geolocation, altitude, pressure, temperature, humidity. Some of said data can be collected via local sensors, other data may be collected or approximated via a weather database and the rules and decision engines within the server correlate such data. Those of ordinary skill in the art will recognize that such data may be important in system with batteries and fuel cell components as they performance characteristics will vary based on variations in same. In addition to the environment data the system will also collect the identity of some or all of the power-consuming devices 200 to which the charging device 100 is connected for charging or power supply. The data can be stored or buffered in an internal data log 804. The data can be transferred either in real time, or in periodic bursts, to the server 5 at suitable times consistent with the availability of the data link 208 or 208a, 208b.

The data can be technically and/or commercially useful to: (i) manufacturers and/or vendors of the power-consuming devices 200, (ii) manufacturers and/or vendors of the charging devices 100; and, (iii) vendors of consumer services and products associated with the power-consuming devices 200 and/or the charging devices 100.

For example, the service provider 800 could be a manufacturer or vendor of power-consuming devices 200, or a service provider connected with the use of such power-consuming devices 200, e.g. mobile telephones. The charging device 100 may provide useful information relating to the performance of the charging process, indicative of the technical performance of the battery or power management system of the power-consuming device, its identity and its patterns or mode of use. In another example, the service provider 800 could be a manufacturer or vendor of charging devices 100, or a service provider connected with the use of such power-consuming devices 100, e.g. a fuel cell power supply manufacturer. The charging device 100 may then provide the service provider 800 with useful information relating to the performance of the charging process as it relates to different types of power-consuming device, and to different modes of use.

By way of example, the data gathered by the charging device 100 may include any or all of the following types of data: (i) a unique identifier, e.g. the individual identity or serial number of any power-consuming device 200 that has been connected to the charging device 100; (ii) a generic type identifier, e.g. the device type or class of device any power-consuming device 200 that has been connected to the charging device 100; (iii) a manufacturer identity, e.g. the identity of the manufacturer of any power-consuming device 200 that has been connected to the charging device 100; (iv) the date and/or time of each charging event; (v) the voltage and/or current profile or 'signature' of each charging event, e.g. a current-time profile, a voltage-time profile, a voltage-current profile, a charge state-time profile, which may be derived over time from a separate database which can match the profile of what is measured through the intelligence of the charging device comparing with other database records to match or approximate what the device is in the event that the device cannot be detected then and there by asking it "what it is" with a query from the charger to the device for instance; (vi) the geographical location of each charging event, which could be automatically sensed either by the charging device 100 or the power-consuming device 200, e.g. using GPS sensing, collected environment data, network address sensing or a combination thereof; (vii) the condition of the charging device 100 at, before, during or after each charging event (e.g. for a hydrogen fuel cell, the hydrogen level remaining or fuel cell performance parameter); (viii) a usage profile of the power-consuming device 200 or the charging device 100, e.g. time and frequency of use, power demand, modes of use etc.

The above list is not intended to be exhaustive but provides examples of information relating to the identity of the power-consuming device to which the charging device is connected. Such information can be usefully deployed for a wide range of purposes. The data can be used to authorize use of the charger 100 for a particular charging event (e.g. to prevent unauthorized or inappropriate use that could damage either the charger 100 or power-consuming device 200). Environment data may be provided to at least one of the device, charger and the server wherein system parameters and data may be correlated to the environment data.

The data can be used to control a mode of use of the charger, e.g. by ensuring use of a particular charging mode or operational profile of the charging device for each power-consuming device 200 to which it is connected to prevent damage to either device. Examples of a charging mode or operational profile could include determining maximum current or voltage as a function of time and/or existing charge state or voltage, or could include limiting current for some or all of a charging event.

The data can be used to provide information on the technical performance of either the charging device 100 or the power-consuming device 200 under varying conditions of use, including frequency of charging, location of charging, and conditions prevailing during charging. Such conditions could include local conditions of temperature or humidity or air pressure, for example. Environment data, as previously noted, may be derived locally, or acquired from remote locations (i.e. weather websites).

Such technical data may be useful in assessing the performance of devices over many hundreds or thousands of power-consuming devices in widely varying conditions of use. Such data when aggregated for particular types of power-consuming device, over many thousands or millions of charging events, can be used to very accurately identify problems with the technical design of the power-consuming device or the charging device, or with different users' modes of use of the devices. This can direct product improvement either to the existing devices or to future devices. The data could direct product improvement to existing devices by facilitating the re-design and download of, for example, software upgrades to either the charger 100 or the power-consuming device. The software could control power management in the devices.

The data may be used to indicate when device servicing or replacement is required, or to optimize service plans of the devices, including indicating when a fuel source (e.g. hydrogen source) for a charging device may need replenishment. The data may be used to manage such servicing, e.g. by enabling a service provider to indicate directly to the user how and where to effect such servicing, based on the gathered data. The data may be used to collect data on user choice of devices and such data may predict trends of use. The data may also track brand (device such as cell phone) to market dominance as well as success or decline in a brand.

Where the power-consuming device 200 has on-board intelligence, such as a data processing capability and/or data communication facility (e.g. USB connectivity), the charging device 100 may be able to interrogate the power-consuming device 200 to supply at least some if not all the required data directly, using a suitable data exchange protocol for connectivity of the charging device and the power-consuming device. This could be supported by USB protocols, for example.

In other arrangements, the charging device 100 may be configured to deduce some or all of the required data itself by monitoring an observable characteristic of the power-consuming device during operation or charging, such as the voltage and/or current profile as a function of time or 'signature' of the charging process. By collecting detailed information on charging per user, per location and per device(s) energy (or utility) packages may be narrowly tailored for the needs of the user.

As demanded by the power-consuming device during the charging or power supply event, the charging device 100 may be able to deduce an identity of, or a device type of, the connected power-consuming device 200 by comparing a voltage and/or current profile or signature with a set of templates each of which indicates a particular device type or device identity. The templates could be stored at a suitable location such as within the charging device 100 or at the remote server 210. The identities of the power-consuming devices 200 that are connected to the charging device 100 can therefore be determined either by the charging device, or by the server 210, or partially in both the charging device and server 210, for example.

In general, the data can be aggregated, analyzed and/or buffered either on the charging device 100 itself in the data log 804 for periodic upload to the central server 210 or can be transmitted unprocessed or partially processed and/or in real time to the central server 210, depending on the availability of a data communication link 208 or 208a, 208b.

The charging device 100 could be supplied to end users together with an application program for use on the power-consuming device 200 (e.g. mobile telephone, portable computer) which controls or monitors operation of the charging device 100, particularly where this is a fuel cell charging device requiring sophisticated management for optimal performance. The application program then also serves as a suitable conduit, via communication channels 208a and 208b, for the data gathered by the charging device 100. The application program can readily be configured and authorized to use the telecommunication data channel 208b of a mobile phone, in order to transfer data to the server 210 over the communication network 207. In such a case, the communication network 207 can be a combination of the cellular telephone network and the Internet. The application program can also provide any required credentials required for access to the server 210.

In a general aspect, reference to the communication channels 208, 208a and 208b may include the transmit/receive components in each of the charging device 100 or power consuming device 200 as appropriate at the device level, and the data connections between them at the overall system level. Thus, in the context of a charging device 100, the expression 'communication channel' can be understood to refer to the transmit and receive and interface components and connectors within the device necessary to achieve a communication with the network 207 or power consuming device 200. In the context of the overall system level, the expression 'communication channel' can be understood to refer to all elements in the communication chain between the charging device and the server 210.

Aspects of the disclosed subject matter can be implemented in any convenient form, for example using dedicated hardware, or a mixture of dedicated hardware and software for the processing of the signals. The processing apparatuses can comprise any suitably programmed apparatuses such as a general purpose computer, personal digital assistant, mobile telephone (such as a WAP or 3G-compliant phone) and so on. Since the processing of the disclosed subject matter can be implemented as software, each and every aspect of the disclosed subject matter thus encompasses computer software implementable on a programmable device. Hence, aspects of the disclosed subject matter can be executed on a programmable machine, such as, but not limited to, a microcontroller or computer processor. Program aspects of the technology may be thought of as "products" or "articles of manufacture" typically in the form of executable code and/or associated data that is carried on or embodied in a type of machine readable medium.

"Storage" type media include any or all of the memory of mobile stations, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. For example, software and/or instructions may be communicated from a server to a client. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the subject matter described in this application. Volatile storage media include dynamic memory, such as main memory of such a computer platform. Tangible transmission media include coaxial cables; copper wire, and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those of ordinary skill in the art will appreciate that the above disclosure, in which particular methods or techniques may be described in relation to particular items illustrated in figures are merely for the purpose of illustration, and that it is within the ordinary skills of the art to alternatively perform such methods or techniques with other items illustrated. Such alternatives merely illustrate the ease with which, particularly where systems can exchange data with each other, programmed functionality can be moved and/or distributed among a plurality of programmable processors.

It is to be understood that any feature described in relation to any one aspect may be used alone, or in combination with other features described, and may also be used in combination with one or more features of any other of the disclosed aspects, or any combination of any other of the disclosed aspects. Furthermore, equivalents and modifications not described above may also be employed without departing from the scope of the disclosed subject matter.

The many features and advantages of the disclosed subject matter are apparent from the detailed specification, and thus, it is intended by the appended claims to cover all such features and advantages of the disclosed subject matter which fall within the true spirit and scope of the disclosed subject matter. Further, since numerous modifications and variations will readily occur to those skilled in the art, it is not desired to limit the disclosed subject matter to the exact construction and operation illustrated and described, and accordingly, all suitable modifications and equivalents may be resorted to, falling within the scope of the disclosed subject matter.

Further, each of the various elements of the disclosure and claims may also be achieved in a variety of manners. This disclosure should be understood to encompass each such variation, be it a variation of an implementation of any apparatus implementations, a method or process implementations, or even merely a variation of any element of these.

Particularly, it should be understood that as the disclosure relates to elements of the disclosure, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element, disclosed, should be understood to encompass a disclosure of the action which that physical element facilitates.

To the extent that insubstantial substitutes are made, to the extent that the applicant did not in fact draft any claim so as to literally encompass any particular exemplary implementations, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative exemplary implementations.

Further, the use of the transitional phrase "comprising" is used to maintain the "opened" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

What is claimed:

1. A charging device comprising:
    a housing comprising an output end comprising an output port, a fuel supply end comprising a fuel inlet port and an external power input, and a housing body having cooling vents;
    a fuel cell system comprising an inlet valve actuated by a latching solenoid, a fuel cell stack, a purge valve actuated by a normally-closed non-latching solenoid, a hydrogen pressure transducer, a stack temperature sensor, and a cooling system;
        wherein the inlet valve is fluidly connected to the fuel inlet port to provide a pathway for fluid flow between the inlet valve and the fuel inlet port;
        wherein the purge valve is fluidly connected to the fuel cell stack to provide a pathway for fluid flow between the fuel cell stack and the purge valve;
    a balance of plant comprising a printed circuit board assembly and a battery; and,
    wherein the charging device is configured to provide power to the output port via one of the battery, the fuel cell stack, and an external power source electrically connected to the external power input;
    wherein the purge valve is configured to clear excess water vapor from an anode in the fuel cell stack when opened; and,
    wherein the charging device is configured to periodically open the purge valve for a total of no more than about 400 milliseconds of cumulative durations of purge valve opening time every 300 seconds and with a hold-up period of about 72 seconds for every 100 milliseconds of duration of purge valve opening time.

2. A system for delivering power to a power-consuming device comprising:
    a charging device of claim 1; and,
    a source of hydrogen gas.

3. The charging system of claim 2, wherein the source of hydrogen gas comprises a pressurized tank.

4. The charging system of claim 2, wherein the source of hydrogen gas comprises a cartridge filled with a metal hydride and adapted to produce hydrogen gas.

5. The charging device of claim 1, wherein the charging device is configured to monitor the status of one or more battery and the fuel cell stack.

6. The device of claim 5, wherein the charging device is configured to monitor a status of the fuel cell stack by monitoring one or more of the fuel cell stack voltage and the fuel cell stack current.

7. A method of charging the battery of the charging device of claim 1, the method comprising:
    connecting a source of hydrogen gas to the fuel inlet port;
    operating the fuel cell stack; and,
    charging the battery at one of a plurality of charge levels.

8. A method of charging the battery of the charging device of claim 7, the method comprising:
    connecting an external power source to the external power input; and,
    selecting one of a plurality of charge levels to charge a battery.

* * * * *